(12) United States Patent
Brown et al.

(10) Patent No.: US 12,390,765 B2
(45) Date of Patent: Aug. 19, 2025

(54) SYSTEM AND METHOD FOR IDENTIFYING, SELECTING AND PURIFYING PARTICLES

(71) Applicant: THE TRUSTEES OF INDIANA UNIVERSITY, Bloomington, IN (US)

(72) Inventors: Brooke A. Brown, Bloomington, IN (US); David E. Clemmer, Bloomington, IN (US); Martin F. Jarrold, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 322 days.

(21) Appl. No.: 17/766,388

(22) PCT Filed: Oct. 9, 2020

(86) PCT No.: PCT/US2020/054975
§ 371 (c)(1),
(2) Date: Apr. 4, 2022

(87) PCT Pub. No.: WO2021/072186
PCT Pub. Date: Apr. 15, 2021

(65) Prior Publication Data
US 2024/0050895 A1 Feb. 15, 2024

Related U.S. Application Data

(60) Provisional application No. 62/913,460, filed on Oct. 10, 2019, provisional application No. 62/949,559, (Continued)

(51) Int. Cl.
*B01D 59/00* (2006.01)
*B01D 59/46* (2006.01)
(Continued)

(52) U.S. Cl.
CPC ............... *B01D 59/46* (2013.01); *H01J 3/40* (2013.01); *H01J 49/26* (2013.01)

(58) Field of Classification Search
CPC ... B01D 59/46; H01J 3/40; H01J 49/26; H01J 49/421
(Continued)

(56) References Cited

U.S. PATENT DOCUMENTS 3,019,168 A 1/1962 Taylor
3,294,085 A 12/1966 Wallace
(Continued)

FOREIGN PATENT DOCUMENTS

CA 2484769 A1 4/2005
CN 102714127 A 10/2012
(Continued)

OTHER PUBLICATIONS

Final Office Action, mailed Oct. 1, 2024 and issued in connection with JP Appln. No. 2022-521245, 9 pages.
(Continued)

*Primary Examiner* — Michael Maskell
(74) *Attorney, Agent, or Firm* — Barnes & Thonrburg LLP

(57) ABSTRACT

A method for purifying particles generates charged particles from a sample, measures at least at least one of masses, charge magnitudes and mobilities of the generated charged particles, and selectively passes to a particle collection target each of the measured charged particles having at least one of (a) a measured mass equal to a selected mass or within a selected range of particle masses, (b) a measured charge magnitude equal to a selected charge magnitude or within a selected range of charge magnitudes, (c) a mass-to-charge ratio equal to a selected mass-to-charge ratio or within a selected range of mass-to-charge ratios, and (d) a measured
(Continued)

mobility equal to a selected mobility or within a selected range of mobilities. In some embodiments, the collected particles may be harvested and amplified.

20 Claims, 13 Drawing Sheets

Related U.S. Application Data filed on Dec. 18, 2019, provisional application No. 62/972,403, filed on Feb. 10, 2020.

(51) Int. Cl.
*H01J 3/40* (2006.01)
*H01J 49/26* (2006.01)

(58) Field of Classification Search
USPC .................................. 250/281, 282, 288
See application file for complete search history.

(56) References Cited

U.S. PATENT DOCUMENTS

| | | | |
|---|---|---|---|
| 5,285,063 A | 2/1994 | Schwartz et al. |
| 5,478,745 A | 12/1995 | Samulski |
| 5,572,025 A | 11/1996 | Cotter |
| 5,770,857 A | 6/1998 | Fuerstenau et al. |
| 5,847,386 A | 12/1998 | Thomson |
| 5,863,541 A | 1/1999 | Samulski et al. |
| 5,869,248 A | 2/1999 | Yuan et al. |
| 5,877,022 A | 3/1999 | Stinchcomb et al. |
| 5,880,466 A | 3/1999 | Benner |
| 5,882,652 A | 3/1999 | Valdes et al. |
| 5,886,346 A | 3/1999 | Makarov |
| 5,905,040 A | 5/1999 | Mazzara et al. |
| 5,916,563 A | 6/1999 | Young et al. |
| 5,965,358 A | 10/1999 | Carrion et al. |
| 6,013,487 A | 1/2000 | Mitchell |
| 6,083,702 A | 7/2000 | Mitchell et al. |
| 6,156,303 A | 12/2000 | Russell et al. |
| 6,183,950 B1 | 2/2001 | Madonna |
| 6,583,408 B2 | 6/2003 | Smith et al. |
| 6,630,662 B1 | 10/2003 | Loboda |
| 6,744,042 B2 | 6/2004 | Zajfman et al. |
| 6,753,523 B1 | 6/2004 | Whitehouse |
| 6,888,130 B1 | 5/2005 | Gonin |
| 7,314,912 B1 | 1/2008 | Hallek et al. |
| 7,829,842 B2 | 11/2010 | Makarov |
| 8,294,085 B2 | 10/2012 | Ding |
| 8,395,112 B1 | 3/2013 | Bier |
| 8,409,870 B2 | 4/2013 | Van Wuijckhuijse |
| 8,766,170 B2 | 7/2014 | Guna et al. |
| 8,866,074 B2 | 10/2014 | Okumura |
| 8,963,075 B2 | 2/2015 | Chen et al. |
| 9,095,793 B2 | 8/2015 | Flagan |
| 9,294,085 B1 | 3/2016 | Gruner |
| 9,395,112 B2 | 7/2016 | Prins |
| 9,409,870 B2 | 8/2016 | Armani |
| 9,472,390 B2 | 10/2016 | Verenchikov |
| 10,056,244 B1 | 8/2018 | Quarmby et al. |
| 10,088,451 B2 | 10/2018 | Giles et al. |
| 11,177,122 B2 | 11/2021 | Jarrold |
| 11,227,759 B2 | 1/2022 | Jarrold |
| 11,232,941 B2* | 1/2022 | Jarrold ................ H01J 49/4235 |
| 11,257,665 B2 | 2/2022 | Jarrold |
| 11,562,896 B2 | 1/2023 | Jarrold |
| 11,942,317 B2 | 3/2024 | Clemmer |
| 12,112,936 B2 | 10/2024 | Jarrold |
| 2001/0013760 A1 | 8/2001 | Uchida |
| 2002/0014586 A1 | 2/2002 | Clemmer |
| 2002/0185606 A1 | 12/2002 | Smith et al. |
| 2003/0155502 A1 | 8/2003 | Grosshans et al. |
| 2004/0169137 A1 | 9/2004 | Westphall et al. |
| 2005/0236375 A1 | 10/2005 | Gefter et al. |
| 2007/0102634 A1 | 5/2007 | Frey et al. |
| 2007/0254352 A1 | 11/2007 | Schaffer et al. |
| 2009/0020694 A1 | 1/2009 | Florey |
| 2009/0057553 A1 | 3/2009 | Goodenowe |
| 2009/0078866 A1 | 3/2009 | Li et al. |
| 2009/0108194 A1 | 4/2009 | Page et al. |
| 2009/0189069 A1 | 7/2009 | Chen |
| 2009/0294641 A1 | 12/2009 | Konicek et al. |
| 2009/0294655 A1 | 12/2009 | Ding et al. |
| 2010/0084549 A1 | 4/2010 | Ermakov et al. |
| 2010/0084552 A1 | 4/2010 | Kawana |
| 2010/0090102 A1 | 4/2010 | Rather et al. |
| 2010/0227310 A1 | 9/2010 | Manalis et al. |
| 2010/0234837 A1 | 9/2010 | Alfano |
| 2010/0314538 A1 | 12/2010 | Makarov et al. |
| 2010/0320377 A1 | 12/2010 | Cotter |
| 2011/0095175 A1 | 4/2011 | Bateman |
| 2011/0240845 A1 | 10/2011 | Ding |
| 2012/0112056 A1 | 5/2012 | Brucker et al. |
| 2012/0138785 A1 | 6/2012 | Makarov |
| 2012/0282641 A1 | 11/2012 | Reilly et al. |
| 2012/0292498 A1 | 11/2012 | Jiang |
| 2013/0068942 A1 | 3/2013 | Verenchikov |
| 2013/0124099 A1 | 5/2013 | Ecker et al. |
| 2013/0175440 A1 | 7/2013 | Perelman et al. |
| 2013/0200261 A1 | 8/2013 | Mizutani et al. |
| 2013/0234017 A1 | 9/2013 | Kaltashov et al. |
| 2013/0327934 A1 | 12/2013 | Makarov et al. |
| 2014/0131568 A1 | 5/2014 | Green |
| 2014/0197333 A1 | 7/2014 | Jolliffe et al. |
| 2014/0299766 A1 | 10/2014 | Anderson et al. |
| 2014/0346344 A1 | 11/2014 | Chen |
| 2015/0008316 A1 | 1/2015 | Guna |
| 2015/0021472 A1 | 1/2015 | Makarov |
| 2015/0228445 A1 | 8/2015 | Chang |
| 2015/0325425 A1 | 11/2015 | Makarov |
| 2015/0331000 A1 | 11/2015 | Collier et al. |
| 2015/0340221 A1* | 11/2015 | Benner .................. H01J 49/10 |
| | | 250/288 |
| 2016/0005580 A1 | 1/2016 | Grinfeld |
| 2016/0035556 A1 | 2/2016 | Berkout et al. |
| 2016/0181084 A1 | 6/2016 | Smith |
| 2016/0336165 A1 | 11/2016 | Guna |
| 2017/0040152 A1 | 2/2017 | Makarov |
| 2017/0307565 A1 | 10/2017 | Clemmer et al. |
| 2017/0372883 A1 | 12/2017 | Verenchikov |
| 2018/0138026 A1 | 5/2018 | Stewart |
| 2018/0247805 A1 | 8/2018 | Continetti et al. |
| 2018/0350575 A1 | 12/2018 | Hock |
| 2019/0088459 A1 | 3/2019 | Takahashi |
| 2019/0236142 A1 | 8/2019 | Balakrishnan |
| 2019/0237288 A1 | 8/2019 | Platzgummer |
| 2020/0003739 A1 | 1/2020 | Yamamoto et al. |
| 2020/0243317 A1 | 7/2020 | Lopez-Hilfiker et al. |
| 2020/0357626 A1* | 11/2020 | Jarrold ................ H01J 49/0036 |
| 2021/0183638 A1 | 6/2021 | Nishiguchi |
| 2021/0210332 A1 | 7/2021 | Jarrold |
| 2021/0210335 A1 | 7/2021 | Jarrold |
| 2021/0319994 A1 | 10/2021 | Jarrell |
| 2022/0059332 A1 | 2/2022 | Williams |
| 2023/0013173 A1 | 1/2023 | Jarrold |
| 2023/0039701 A1 | 2/2023 | Jarrold |
| 2023/0046906 A1 | 2/2023 | Jarrold |
| 2023/0048598 A1 | 2/2023 | Jarrold |
| 2024/0087868 A1 | 3/2024 | Jarrold |
| 2024/0087875 A1 | 3/2024 | Jarrold |

FOREIGN PATENT DOCUMENTS

| | | |
|---|---|---|
| CN | 103493173 | 1/2014 |
| CN | 106531608 | 3/2017 |
| CN | 107690690 A | 2/2018 |
| CN | 108627566 | 10/2018 |
| CN | 110506320 A | 11/2019 |
| JP | H01235142 A | 9/1989 |
| JP | 11144675 | 5/1999 |
| JP | 2002-520799 | 7/2002 |
| JP | 2007-506106 | 3/2007 |
| JP | 2008186730 A | 8/2008 |

(56) References Cited

FOREIGN PATENT DOCUMENTS

| | | | |
|---|---|---|---|
| JP | 2011-507194 A | 3/2011 | |
| JP | 2011523172 A | 8/2011 | |
| JP | 2014501429 A | 1/2014 | |
| JP | 2014-165053 A | 7/2014 | |
| JP | 2014-122908 A | 9/2014 | |
| JP | 2016-522401 A | 7/2016 | |
| JP | 2019-056598 A | 4/2019 | |
| WO | 1998011244 A1 | 3/1998 | |
| WO | 9833203 A1 | 7/1998 | |
| WO | 1999061601 A1 | 12/1999 | |
| WO | 1999061601 A2 | 12/1999 | |
| WO | 2000/004568 A1 | 1/2000 | |
| WO | 2000028004 A1 | 5/2000 | |
| WO | 2000028061 A1 | 5/2000 | |
| WO | 2001092551 A2 | 5/2001 | |
| WO | 2003042704 A1 | 5/2003 | |
| WO | 2005/081684 A1 | 9/2005 | |
| WO | 2006130474 A2 | 12/2006 | |
| WO | 2010135830 A1 | 12/2010 | |
| WO | 2012080352 A1 | 6/2012 | |
| WO | 2012083031 A1 | 6/2012 | |
| WO | 2012116765 | 9/2012 | |
| WO | 2012145037 A1 | 10/2012 | |
| WO | 2016073850 A1 | 5/2016 | |
| WO | 2017162779 A1 | 9/2017 | |
| WO | 2017190031 A1 | 11/2017 | |
| WO | 2018/109895 A1 | 6/2018 | |
| WO | 2018217778 A1 | 11/2018 | |
| WO | 2019118242 A1 | 6/2019 | |
| WO | 20190140233 A1 | 7/2019 | |
| WO | WO-2019140233 A1 * | 7/2019 | .......... H01J 49/0036 |
| WO | 2019162687 A1 | 8/2019 | |
| WO | 2019231854 A1 | 12/2019 | |
| WO | 2023025400 | 3/2023 | |
| WO | 2023111538 A1 | 6/2023 | |
| WO | 2023111707 A1 | 6/2023 | |
| WO | 2023139351 A1 | 7/2023 | |
| WO | 2024023525 A1 | 2/2024 | |

OTHER PUBLICATIONS

Katakura et al. "A New Concept of Isotope Separation using Ion Cyclotron Resonance in a Magnetic Field Having a Radial Component", Japanese Journal of Applied Physics, Japan Society of Applied Physics, JP, vol. 32, No. 5A, Part 01 (May 1, 1993), pp. 2167-2174, XP000413943, ISSN: 0021-4922, DOI: 10.1143/JJAP. 32.2167 *abstract*.

Pin Li et al., "Progress in Exosome Isolation Techniques", THERANOSTICS, vol. 7, No. 3, (Jan. 1, 2017), pp. 789-804, XP055417509, AU, ISSN 1838-7640, DOI: 10.7150/thno.18133.

Supplemental European Search Report for counterpart European Patent Application No. 20874490.4 dated Oct. 10, 2023 (9 pages).

PCT International Search Report and Written Opinion completed by the ISA/US on Jan. 24, 2021 and issued in connection with PCT/US2020/054975.

Japanese Office Action dispatched Jan. 31, 2023 for co-pending application 2020-568364—9 pages.

English translation of an Office Action for Japanese Patent Appln. No. 2022-537367, dated Oct. 8, 2024, 6 pages.

English translation of an Office Action for Japanese Patent Appln. No. 2022-537360, dated Oct. 8, 2024, 3 pages.

European Office Action dated Dec. 9, 2024 and issued in connection with EP Appln. No. 20839501.2, 5 pages.

European Office Action dated Dec. 9, 2024 and issued in connection with EP Appln. No. 20839500.4, 5 pages.

Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).

Chiorini, John A., "Cloning and Characterization of Adeno-Associated Virus Type 5", Journal of Virology, vol. 73, DP-1309-1319 (Feb. 1999).

Chernushevich, et al., Collisional cooling of large ions in electrospray mass spectrometry. Anal. Chem 76. H54-1760 (2004).

Cleves, Ann E., "Protein transport: The nonclassical ins and outs", Current Biology, vol. 7, No. 5, pp. 318-320 (1997).

Contino, Nathan Colby, "Ion trap charge detection mass spectrometry: Lowering limits of detection and improving signal to noise", ISBN: 9781303535048, Jul. 30, 2013 (Jul. 30, 2017).

Ding, et al., A simulation study of the digital ion trap mass spectrometer. Int. J. Mass Spectrom. 221, 117-138 (2002).

Ding, et al., A digital ion trap mass spectrometer coupled with atmospheric pressure ion sources. J_ Mass Spectrom. 69, 471-484 (2004).

Douglas J_ Linear quadrupoles in mass spectrometry. Mass Spectrom. Rev. 28, 937-960 (2009).

Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.

Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.

Draper, Benjamin E., et al., "Real-Time Analysis and Signal Optimization for Charge Detection Mass Spectrometry", J. Am. Soc. Mass Spectrom. (2019) 30:898Y904.

El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.

Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.

Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.

Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).

Emerson, S., et al. "Hepatitis E Virus", Virology, vol. 2, Chapter 70; (4th ed., Lippincott-Raven Publishers).

Fields, Bernard, et al. "Parvoviridae: The Viruses and Their Replication" Virology, vol. 2, Chapter 69, pp. 2327-2359; 4th ed., Lippincott-Raven Publishers).

Fuerstenau, et al., "Mass Spectrometry of an Intact Virus", Agnew. Chem. 2001, 559-562.

Gao, Guangping, et al. "Clades of Adeno-Associated Viruses Are Widely Disseminated in Human Tissues", vol. 78, pp. 6381-6388 (Jun. 2004).

Gao, Guangping, et al. "Novel Adeno-Associated Viruses from Rhesus Monkeys as Vectors for Human Gene Therap",.; National Academy of Sciences, vol. 99, No. 18, pp. 11854-11859 (Sep. 3, 2002).

Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).

Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).

Grinfeld, Dmitry, et al. "Space-Charge Effects in An Electrostatic Multireflection Ion Trap", European Journal of Mass Spectrometry, vol. 20, No. 2, Apr. 1, 2014 (Apr. 1,2 014), p. 131-142.

Hauck, B., et al. "Characterization of Tissue Tropism Determinants of Adeno-Associated Virus Type 1", Journal of Virology, vol. 77, No. 4, pp. 2768-2774 (Feb. 2003).

Heller, Manfred, et al. "Mass spectrometry-based analytical tools for the molecular protein characterization of human plasma lipoproteins", PROTEOMICS, vol. 5, No. 19, Jul. 1 (205-97-91), pp. 2619-2639.

(56) References Cited

OTHER PUBLICATIONS

Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied b digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Mori, Seiichiro, Mori, et al. "Two novel adeno-associated viruses from cynomolgus monkey: pseudotyping characterization of capsid protein", Virology 330, pp. 375-383 (2004).
Miyamura, K., et al. "Parvovirus Particles as Platforms for Protein Presentation", National Academy of Sciences, vol. 1, No. 18,pp. 8507-8511 (Aug. 30, 1994).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Nie et al., Frequency scan of a quadrupole mass analyzer in the third stability region for protein analysis. J. Chin. Chem_ Soc., 53, 47-52 (2006).
Japanese Office Action dispatched Feb. 17, 2023 for application 2020-568389—11 pages.
European Office Action issued Mar. 3, 2023 for application 19732193.8—14 pages.
First Office Action for Counterpart Chinese Patent Application No. 2022-521245 dated Mar. 7, 2024, 9 pages, with appended English language translation.
Japanese Office Action dispatched Jan. 24, 2023 for co-pending application 2021-527871—4 pages (Prior art reference Alexander Makarov has been previously submitted).
Japanese Office Action dispatched Jan. 18, 2023 for 2020-568469—16 pages (References 1, 2, 3 and 5 , and prior art document JP 2010-515210 English equivalent US 2013/327934A1, cited in this document have been previously submitted).
Japanese Office Action dispatched Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs In the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Shinholt, Deven L., et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Syed, et al., Quadrupole mass filler: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).

(56) References Cited

OTHER PUBLICATIONS

Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Walters, Robert W., "Structure of Adeno-Associated Virus Serotype 5", Journal of Virology, vol. 78, No. 7, pp. B361-3371 (Apr. 2004).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and iangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
Brown, Brooke Ann, et al., "Charge Detection Mass Spectrometry Measurements of Exosomes and other Extracellular Particles Enriched from Bovine Milk" Anal. Chem., Just Accepted Manuscript . DOI: 10.1021/acs.analchem.9b05173 • Publication Date (Web): Jan. 28, 2020 Downloaded from pubs.acs.org on Jan. 30, 2020.
Kosaka, Nobuyoshi, et al., "Versatile roles of extracellular vesicles in cancer," J Clin Invest. 2016;126(4):1163-1172. https://doi.org/10.1172/JCI81130.
Extended EP Search Report completed 29AUG24 and issued in connection with EP Appln. No. 24174366., 12 pages.
English translation of an Office Action for Japanese Patent Appln. No. 2022-547047, dated Aug. 1, 2024.
PCT International Search Report and Written Opinion completed by the ISA/US on Jan. 12, 2016 and issued in connection with PCT/US2015/059463.
PCT International Search Report and Written Opinion completed by the ISA/US on Jun. 19, 2017 and issued in connection with PCT/US2017/030163.
PCT International Search Report and Written Opinion completed by the ISA/EP on Feb. 14, 2019 and issued in connection with PCT/US2018/051944.
PCT International Search Report and Written Opinion completed by the ISA/EP on Apr. 18, 2019 and issued in connection with PCT/US2019/013251.
PCT International Search Report and Written Opinion completed by the ISA/EP on Apr. 16, 2019 and issued in connection with PCT/US2019/013274.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.
PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT/US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/US on Nov. 23, 202020 and issued in connection with PCT/US2020/052009.
PCT International Search Report and Written Opinion completed by the ISA/EP on Jul. 14,2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).

(56) References Cited

OTHER PUBLICATIONS

Beuhler, et al., A study of the formation of high molecular weight water cluster ions (m/e < 59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi:10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. 477-488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
PCT International Search Report and Written Opinion completed by the ISA/US on Oct. 11, 2021 and issued in connection with PCT/US2021/034480.
Fernandez-Maestre et al. "Ammonia as a Modifier in Ion Mobility Spectrometry: Effects On On Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.
Kiss et al. "Size, weight and position: ion mobility spectrometry and imaging MS combined", Anal Bioanal Chem. 2011. 399: pp. 2623-2634, especially: p. 2626, col. 1, para 1.
Office Action from corresponding Korea Patent Application No. 10-2020-7037876, mailed May 16, 2024.
Office Action, issued Jun. 23, 2023 for counterpart Japan Patent Application No. 2020-568469 (English Translation).
Office Action, issued Jan. 18, 2023 for counterpart Japan Patent Application No. 2020-568469 (English Translation).
Examination report No. 1 issued Oct. 21, 2022 in Australian Application No. 2019281255—4 pages.
European Office Action dated Sep. 9, 2022 for application 19 702 775.8—5 pages.
PCT International Search Report and Written Opinion completed by the ISA/US on Mar. 8, 2021 and issued in connection with PCT/US2020/65300.
Extended European Search Report for copending application No. 21751374.6, dated Feb. 21, 2024.
Bernaud J et al. "Characterization of AAV vector particle stability at the single-capsid level." J. Biol. Phys., vol. 44, 2018, pp. 181-194, XP036492006.
Barnes L F et al. "Analysis of thermally driven structural changes, genome release, disassembly, and aggregation of recombinant AAV by CDMS." Molecular Therapy—Methods & Clinical Development, vol. 27, Dec. 1, 2022 (Dec. 1, 2022), pp. 327-356, XP093127574, GB, ISSN: 2329-0501, DOI: 10.1016/j.omtm.2022.10.008.
PCT International Search Report and Written Opinion completed by the ISA/US on Apr. 5, 2021 and issued in connection with PCT/US2021/016325.
Korean Office Action dated May 1, 2024 for co-pending application No. 10-2021-7019302.
Office Action and Search Report for co-pending Chinese Patent Application No. 201980079672.7, dated Nov. 1, 2023. (English translation appended).
Satoh, "Development of JMS-S3000: MALDI-TOF/TOF Utilizing a Spiral Ion Trajectory," JEOL News, vol. 45, No. 1, 34-37 (2010).
European Office Action dated Sep. 9, 2022 for application 19 702 771.7—5 pages.
PCT International Search Report and Written Opinion completed by the ISA/US on Aug. 26, 2022 and issued in connection with PCT/US2022/073503.
European Office Action dated Nov. 23, 2022 for application 19 702 773.3—5 pages.
European Office Action dated Jun. 26, 2024 and issued in connection with EP Patent Appln. No. 19707901.5, 8 pages.
International Search Report and Written Opinion for copending application No. PCT/US2023/073631, dated Feb. 9, 2024.
Seiji Ogata et al. "Real-time Optimization Method for Optical Parameters of Ion Implanters." AIP Conf. Proa, vol. 866, 1 (2006): 433-136. https://doi.org/10.1063/1.2401549.
Martin F. Jarrold. "Applications of Charge Detection Mass Spectrometry in Molecular Biology and Biotechnology." Chem. Rev. 2022, 122, 7415-7441. DOI: 10.1021/acs.chemrev.1c00377.
Neustock, L.T. et al. "Inverse Design Tool for Ion Optical Devices using the Adjoint Variable Method." Sci Rep 9, 11031 (2019). https://doi.Org/10.1038/S41598-019-47408-w.
Bot, Marek-Verfasser. "Gas-Phase Study of Dispersion-Bound Complexes." Gas-Phase Study of Dispersion-Bound Complexes, ETH Zurich, 2019. https://doi.org/10.3929/ethz-b-000424112.
Barnes, Lauren F et al. "Analysis of Recombinant Adenovirus Vectors by Ion Trap Charge Detection Mass Spectrometry: Accurate Molecular Weight Measurements beyond 150 MDa." Analytical chemistry vol. 94,3 (2022): 1543-1551. doi: 10.1021/acs.analchem. 1 c02439.
Miller, Philip E et al. "The Quadrupole Mass Filter: Basic Operating Concepts." Journal of Chemical Education, vol. 63,7(1986): 617-622. DOI: 10.1021/ed063p617.
International Search Report for copending international application PCT/US2023/073710, mailed Jan. 17, 2024.
Japanese Office Action (including English translation) issued in App. No. JP2022537360, dated Oct. 8, 2024, 6 pages.
Chinese Office Action (including English translation) issued in App. No. CN202080096842.5, dated Dec. 12, 2024, 19 pages.
Japanese Office Action (including English translation) issued in App. No. JP2022518995, dated Dec. 3, 2024, 6 pages.
Japanese Office Action (including English translation) issued in App. No. JP2022537367, dated Oct. 8, 2024, 11 pages.
Office Action and Search Report for CN patent application No. 201980051696.1, dated Sep. 25, 2023. (translation appended).
Japanese Office Action dispatched Jan. 6, 2023 for application 2020-568366—9 pages.
Non-Final Office Action, mailed Sep. 29, 2024 and issued in connection with U.S. Appl. No. 17/781,483, 84 pages.
International Search Report and Written Opinion issued in App. No. PCT/US2024/057410 mailed Jan. 21, 2025, 16 pages.
Office Action for Korean patent application No. 10-2022-7014884, dated Feb. 2, 2025.
Chinese Office Action (including English translation) issued in App. No. CN202080096856.7, issued on Feb. 17, 2025.
Korean Office Action issued in App. No. KR10-2022-7013722, dated Mar. 10, 2025. Machine translation appended.
Extended European Search Report issued in App. No. EP22842998, dated Apr. 25, 2025, 15 pages.
Wies K et al.: "Development Towards a Laser Ion Source Trap for the Production of Exotic Species", Hyperfine Interactions, Kluwer Academic Publishers, Do, vol. 162, No. 1-4, Apr. 1, 2005 (Apr. 1, 2005), pp. 29-38, XP019246273,ISSN: 1572-9540.
Wu G et al.: "Ion Trajectory Simulation for Electrode Configurations with Arbitrary Geometries", Journal of the American Society for Mass Spectrometry, Elsevier Science Inc, US, vol. 17, No. 9, Sep. 1, 2006 (Sep. 1, 2006), pp. 1216-1228, XP027973707, ISSN: 1044-0305 [retrieved on Sep. 1, 2006].
Chinese Office Action (including English Translation) issued in App. No. CN202080085308.4, dated Feb. 14, 2025.

* cited by examiner

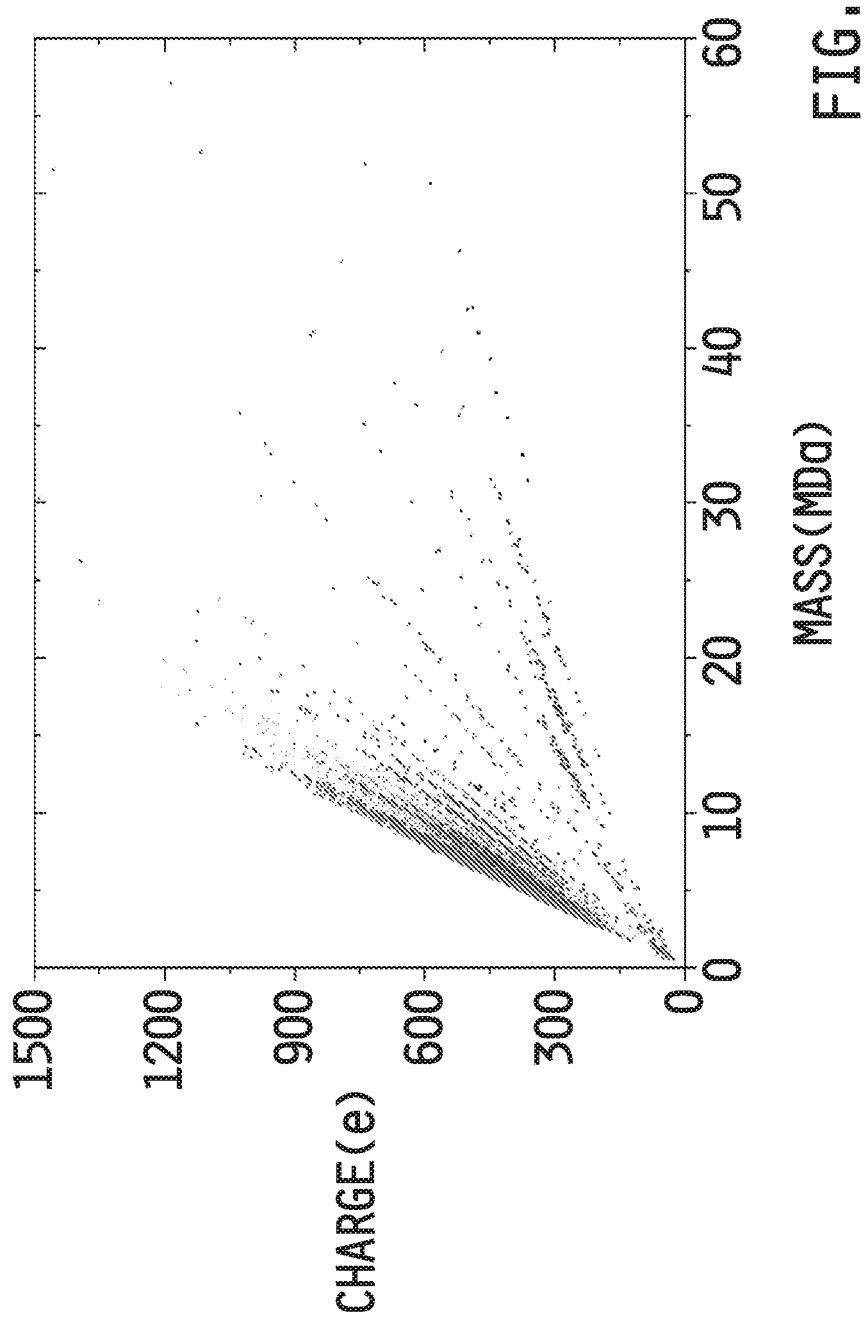

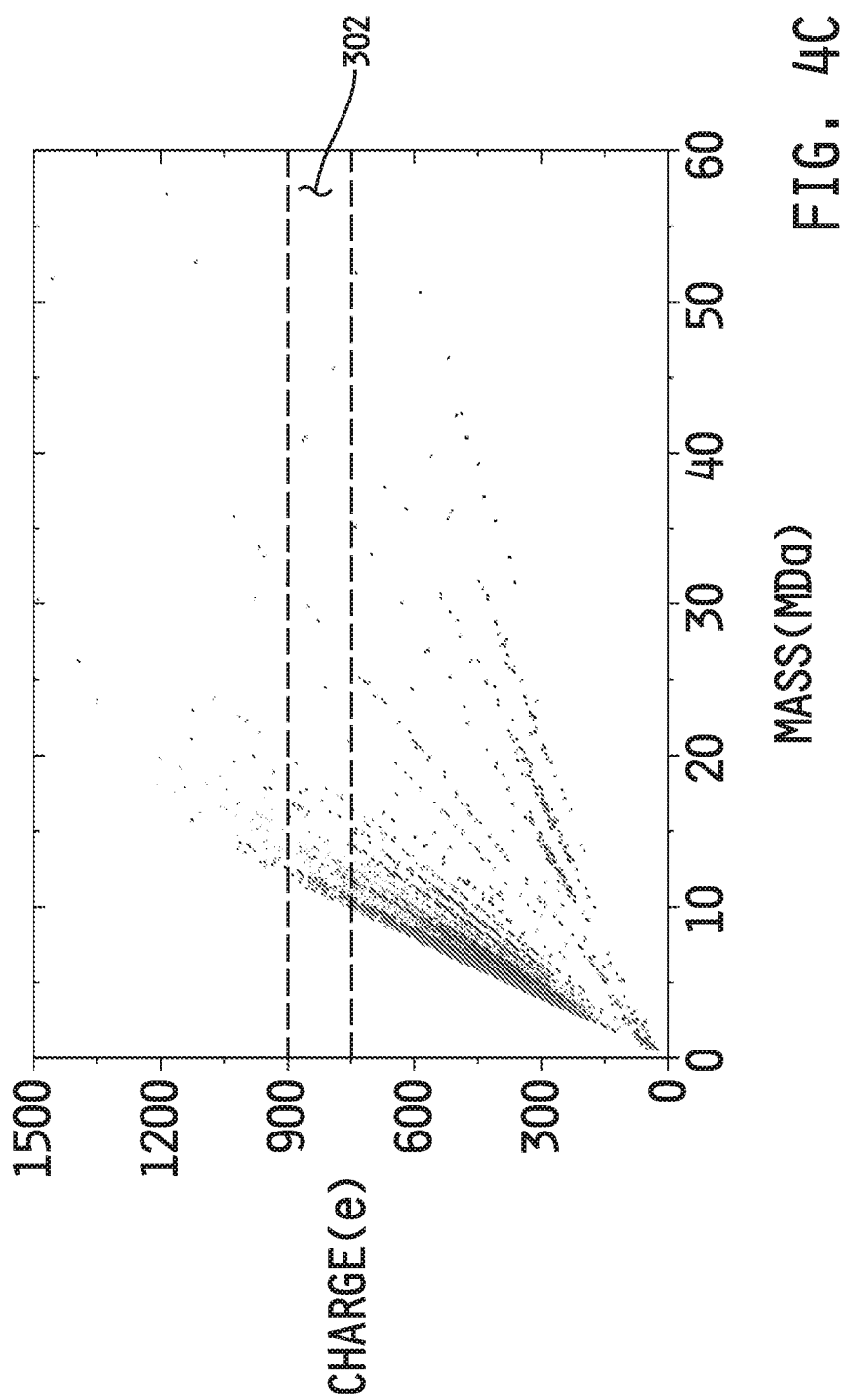

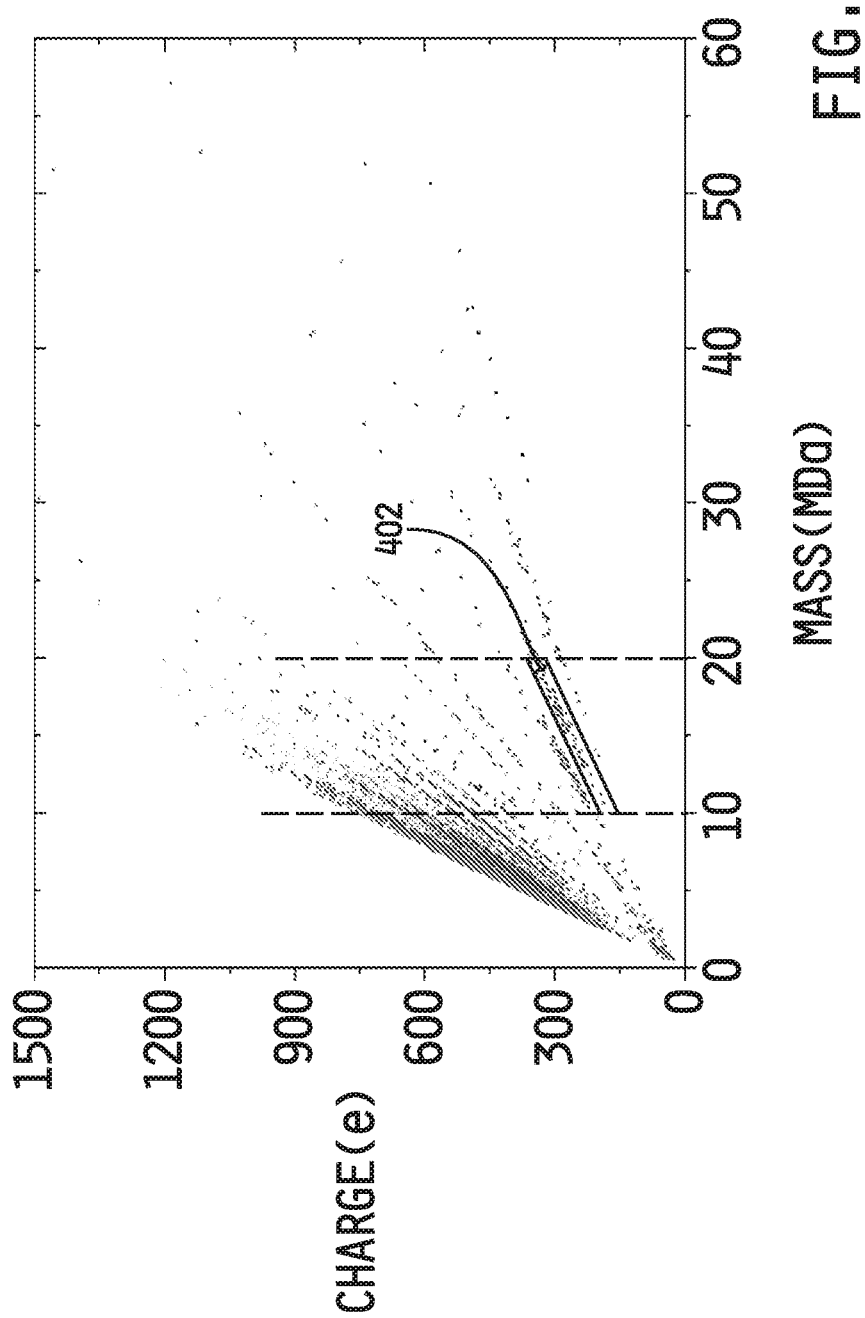

SYSTEM AND METHOD FOR IDENTIFYING, SELECTING AND PURIFYING PARTICLES

CROSS-REFERENCE TO RELATED APPLICATIONS

This patent application is a U.S. national stage entry of PCT Application No. PCT/US2020/054975, filed Oct. 9, 2020, which claims the benefit of and priority to U.S. Provisional Patent Application Ser. No. 62/913,460, filed Oct. 10, 2019, to U.S. Provisional Patent Application Ser. No. 62/949,559, filed Dec. 18, 2019, and to U.S. Provisional Patent Application Ser. No. 62/972,403, filed Feb. 10, 2020, the disclosures of which are all expressly incorporated herein by reference in their entireties.

GOVERNMENT RIGHTS

This invention was made with government support under GM131100 awarded by the National Institutes of Health. The United States Government has certain rights in the invention.

TECHNICAL FIELD

The present disclosure relates generally to instruments and methods for identifying, selecting and purifying particles, and more specifically to instruments and methods for identifying, selecting and purifying particles based on one or more molecular characteristics.

BACKGROUND

Spectrometry instruments provide for the identification of chemical components of a substance by measuring one or more molecular characteristics of the substance. Some such instruments are configured to analyze the substance in solution and others are configured to analyze charged particles of the substance in a gas phase. Molecular information produced by many such charged particle measuring instruments is limited in the number and types of measurable molecular characteristics. Purification of particles with such instruments is therefore likewise limited.

SUMMARY

The present disclosure may comprise one or more of the features recited in the attached claims, and/or one or more of the following features and combinations thereof. In one aspect, a particle purification device may comprise an ion generator configured to generate charged particles from a sample, an ion processing region configured to receive the charged particles generated by the ion generator and to measure at least one of masses and charge magnitudes of the generated charged particles, a particle collection target, means for selectively passing charged particles exiting the ion processing region to the particle collection target, a processor, and a memory having instructions stored therein executable by the processor to cause the processor to control the means for selectively passing charged particles to pass to the particle collection target each of the measured charged particles having at least one of (a) a measured mass equal to a selected mass or within a selected range of particle masses, (b) a measured charge magnitude equal to a selected charge magnitude or within a selected range of charge magnitudes, and (c) a mass-to-charge ratio equal to a selected mass-to-charge ratio or within a selected range of mass-to-charge ratios.

In another aspect, a method for purifying particles may comprise generating charged particles from a sample, measuring at least at least one of masses and charge magnitudes of the generated charged particles, and selectively passing to a particle collection target each of the measured charged particles having at least one of (a) a measured mass equal to a selected mass or within a selected range of particle masses, (b) a measured charge magnitude equal to a selected charge magnitude or within a selected range of charge magnitudes, and (c) a mass-to-charge ratio equal to a selected mass-to-charge ratio or within a selected range of mass-to-charge ratios.

In yet another aspect, a method for purifying particles may comprise generating charged particles from a sample, measuring charge magnitudes of the generated charged particles, and selectively passing to a particle collection target each of the measured charged particles having a measured charge magnitude equal to a selected charge magnitude or within a selected range of charge magnitudes.

In still another aspect, a method for purifying particles may comprise generating charged particles from a sample, measuring masses of the generated charged particles, and selectively passing to a particle collection target each of the measured charged particles having a measured mass equal to a selected mass or within a selected range of particle masses.

In a further aspect, a method for purifying particles may comprise generating charged particles from a sample, measuring masses and charge magnitudes of the generated charged particles, computing mass-to-charge ratios of the measured charged particles based on the measured masses and charge magnitudes, and selectively passing to a particle collection target each of the measured charged particles having a computed mass-to-charge ratio equal to a selected mass-to-charge ratio or within a selected range of mass-to-charge ratios.

In yet a further aspect, a method for purifying particles may comprise generating charged particles from a sample, measuring at least one of masses, charge magnitudes and mobilities of the generated charged particles, and selectively passing to a particle collection target each of the measured charged particles having at least one of (a) a measured mass equal to a selected mass or within a selected range of particle masses, (b) a measured charge magnitude equal to a selected charge magnitude or within a selected range of charge magnitudes, (c) a mass-to-charge ratio equal to a selected mass-to-charge ratio or within a selected range of mass-to-charge ratios, and (d) a measured mobility equal to a selected mobility or within a selected range of mobilities.

In still a further aspect, a method for purifying particles may comprise generating charged particles from a sample, measuring mobilities of the generated charged particles, and selectively passing to a particle collection target each of the measured charged particles having a measured mobility equal to a selected mobility or within a selected range of mobilities.

In yet a further aspect, a method for measuring particles in an extracellular vesicle preparation may comprise generating ions from the extracellular vesicle preparation, and measuring mass and charge of at least a subset of the generated ions using a charge detection mass spectrometer.

In still another aspect, a method for measuring exosomes in a sample preparation may comprise generating ions from the sample preparation, measuring mass and charge of at least some of the generated ions using a charge detection mass spectrometer, and identifying from the measured masses of the at least some of the generated ions a subset of the measured ions that are exosome ions.

BRIEF DESCRIPTION OF THE DRAWINGS

FIG. 4A is a scatter plot of particle charge vs. mass produced from a sample of urinary exomes by an embodiment of the instrument of FIG. 1 in which the ion processing region is implemented in the form of a charge detection mass spectrometer.

FIG. 4C is the plot of FIG. 4A on which is superimposed another example selection of a subpopulation of particles for purification, wherein the selected subpopulation is defined by a specified range of particle charge values.

FIG. 4F is the plot of FIG. 4A on which is superimposed a further example selection of a subpopulation of particles for purification, wherein the selected subpopulation is defined by a specified range of particle mass-to-charge ratio values and a specified range of particle mass values.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to apparatuses and techniques for identifying and/or purifying particles based on one or more molecular characteristics, examples of which may include, but are not limited to, mass, charge, mass-to-charge ratio, mobility, and the like. For purposes of this document, the terms "charged particle" and "ion" may be used interchangeably, and both terms are intended to refer to any particle having a net positive or negative charge. The terms "purify" and "purification" are intended to refer to the identification and extraction, i.e., separation, of a subpopulation of charged particles, generated from a sample, based on one or more molecular characteristics.

Figure 1:
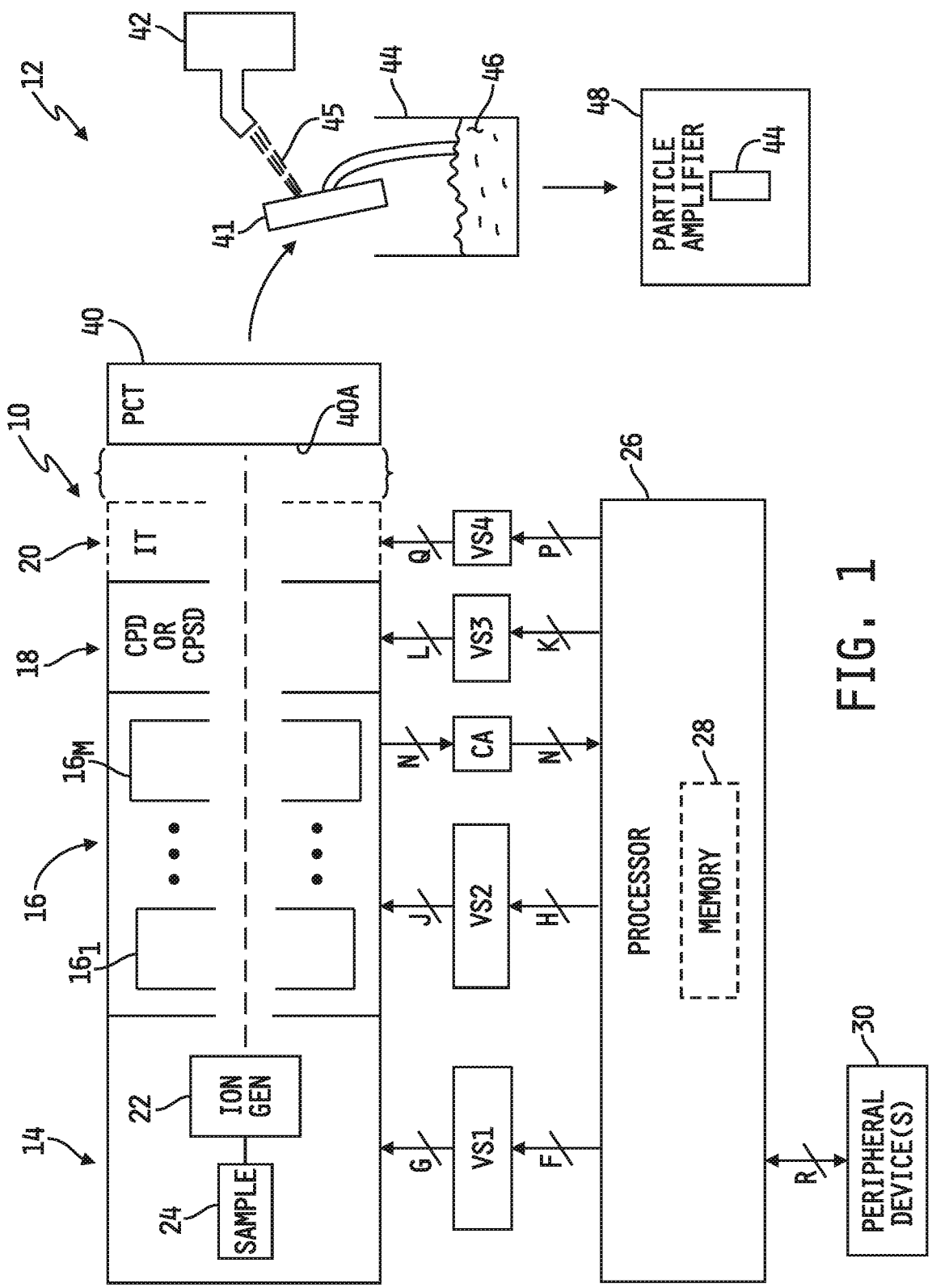
FIG. 1 is a simplified diagram of an instrument and process for purifying particles.

Referring now to FIG. 1, a diagram is shown of an instrument 10 for purifying particles. FIG. 1 further depicts an example process 12 for collecting and, in some embodiments, processing the collected, purified particles. In the illustrated embodiment, the instrument 10 illustratively includes an ion source region 14 having an outlet coupled to an inlet of a charged particle processing region 16. An outlet of the charged particle processing region 16 is coupled to an inlet of a charged particle deflector (CPD) or steering device (CPSD) 18. In some embodiments, the instrument 10 may further optionally include a conventional ion trap (IT) 20 having an inlet coupled to an outlet of the charged particle deflector or steering device 18, and an outlet opposite the inlet, as illustrated in FIG. 1 by dashed-line representation. In such embodiments, the outlet of the ion trap 20 defines a charged particle outlet of the instrument 10. In other embodiments in which the ion trap 20 is omitted, the outlet of the instrument 10 is the outlet of the charged particle deflector or steering device 18.

The ion source region 14 illustratively includes an ion generator 22 configured to generate ions, i.e., charged particles, from a sample 24. The ion generator 22 is illustratively implemented in the form of any conventional device or apparatus for generating ions from a sample. As one illustrative example, which should not be considered to be limiting in any way, the ion generator 22 may be or include a conventional electrospray ionization (ESI) source, a matrix-assisted laser desorption ionization (MALDI) source or other conventional ion generator configured to generate ions from the sample 24. The sample 24 from which the ions are generated may be any biological or other material. In some embodiments, the sample 24 may be dissolved, dispersed or otherwise carried in solution, although in other embodiments the sample may not be in or part of a solution.

In the illustrated embodiment, a voltage source VS1 is electrically connected to a processor 26 via a number, F, of signal paths, where F may be any positive integer, and is further electrically connected to the ion source region 14 via a number, G, of signal paths, where G may likewise be any positive integer. In some embodiments, the voltage source VS1 may be implemented in the form of a single voltage source, and in other embodiments the voltage source VS1 may include any number of separate voltage sources. In some embodiments, the voltage source VS1 may be configured or controlled to produce and supply one or more time-invariant (i.e., DC) voltages of selectable magnitude. Alternatively or additionally, the voltage source VS1 may be configured or controlled to produce and supply one or more switchable time-invariant voltages, i.e., one or more switchable DC voltages. Alternatively or additionally, the voltage source VS1 may be configured or controllable to produce and supply one or more time-varying signals of selectable shape, duty cycle, peak magnitude and/or frequency.

The processor 26 is illustratively conventional and may include a single processing circuit or multiple processing circuits. The processor 26 illustratively includes or is coupled to a memory 28 having instructions stored therein which, when executed by the processor 26, cause the processor 26 to control the voltage source VS1 to produce one or more output voltages for selectively controlling operation of the ion generator 22. In some embodiments, the processor 26 may be implemented in the form of one or more conventional microprocessors or controllers, and in such embodiments the memory 28 may be implemented in the form of one or more conventional memory units having stored therein the instructions in a form of one or more microprocessor-executable instructions or instruction sets. In other embodiments, the processor 26 may be alternatively or additionally implemented in the form of a field programmable gate array (FPGA) or similar circuitry, and in such embodiments the memory 28 may be implemented in the form of programmable logic blocks contained in and/or outside of the FPGA within which the instructions may be programmed and stored. In still other embodiments, the processor 26 and/or memory 28 may be implemented in the form of one or more application specific integrated circuits (ASICs). Those skilled in the art will recognize other forms in which the processor 26 and/or the memory 28 may be implemented, and it will be understood that any such other forms of implementation are contemplated by, and are intended to fall within, this disclosure. In some alternative embodiments, the voltage source VS1 may itself be programmable to selectively produce one or more constant and/or time-varying output voltages.

In the illustrated embodiment, the voltage source VS1 is illustratively configured to be responsive to control signals produced by the processor 26 to produce one or more voltages to cause the ion generator 22 to generate ions from the sample 24. In some embodiments, the sample 24 is positioned within the ion source region 14, as illustrated in FIG. 1, and in other embodiments the sample 24 may be positioned outside of the ion source region 14. In one example embodiment, which should not be considered to be limiting any way, the sample 24 is provided in the form of a solution and the ion generator 22 is a conventional electrospray ionization (ESI) source configured to be responsive to one or more voltages supplied by VS1 to generate ions from the sample 24 in the form of a fine mist of charged droplets. It will be understood that ESI and MALDI, as described hereinabove, represent only two examples of myriad conventional ion generators, and that the ion generator 22 may be or include any such conventional device or apparatus for generating ions from a sample whether or not in solution.

The ion processing region 16 illustratively includes a number, M, of ion processing stages or devices $16_1$-$16_M$, where M may be any positive integer. The one or more ion processing devices $16_1$-$16_M$ is/are illustratively operable to process charged particles, generated in the ion source region 14 and passed into the ion processing region 16, in a manner which measures one or more molecular characteristics of the charged particles, in a manner which filters the charged particles based on one or more molecular characteristics so as to provide a subpopulation or subset of the charged particles having at least one specified molecular characteristic and/or in a manner which dissociates, e.g., fragments, charged particles.

In the illustrated embodiment, a voltage source VS2 is electrically connected to the processor 26 via a number, H, of signal paths, where H may be any positive integer, and is further electrically connected to the ion processing region 16 via a number, J, of signal paths, where J may likewise be any positive integer. In some embodiments, the voltage source VS2 may be implemented in the form of a single voltage source, and in other embodiments the voltage source VS2 may include any number of separate voltage sources. In some embodiments, the voltage source VS2 may be configured or controlled to produce and supply one or more time-invariant (i.e., DC) voltages of selectable magnitude. Alternatively or additionally, the voltage source VS2 may be configured or controlled to produce and supply one or more switchable time-invariant voltages, i.e., one or more switchable DC voltages. Alternatively or additionally, the voltage source VS2 may be configured or controllable to produce and supply one or more time-varying signals of selectable shape, duty cycle, peak magnitude and/or frequency. Generally, one or more outputs of the voltage source VS2 is/are illustratively coupled to each of the one or more ion processing devices $16_1$-$16_M$ in the ion processing region 16, and it will be understood that the number of such outputs and/or the type(s) of voltages produced thereat will depend on the number and/or type of ion processing device(s) making up the one or more ion processing devices $16_1$-$16_M$. In any case, the memory 28 illustratively has instructions stored therein which, when executed by the processor 26, cause the processor 26 to control the voltage source VS2 to produce one or more output voltages for selectively controlling operation of the one or more ion processing devices $16_1$-$16_M$ in the ion processing region 16.

Examples of the ion processing device(s) $16_1$-$16_M$ may include, but are not limited to, in any order and/or combination, one or more devices and/or instruments for separating, collecting and/or filtering charged particles according to one or more molecular characteristics, and/or one or more devices and/or instruments for dissociating, e.g., fragmenting, charged particles. Examples of the one or more devices and/or instruments for separating charged particles according to one or more molecular characteristics may include, but are not limited to, one or more mass spectrometers or mass analyzers, one or more ion mobility spectrometers, one or more gas chromatographs, and the like. Examples of a mass spectrometer, in embodiments of the ion processing device(s) $16_1$-$16_M$ which include one or more thereof, include, but are not limited to, any mass spectrometer operable to measure at least ion mass-to-charge ratio and to pass measured ions from the mass spectrometer to the charged particle deflector or steering device 18. In such embodiments in which the mass spectrometer is operable to measure only ion mass-to-charge ratio, the mass spectrometer may be conventional. In other such embodiments, the mass spectrometer may illustratively be provided in the form of a mass spectrometer configured to measure both mass and charge magnitudes of charged particles generated in the ion source region 14 and passed into the ion processing region 16. In one example of this embodiment, which should not be considered to be limiting in any way, the mass spectrometer may illustratively be implemented in the form of a charge detection mass spectrometer (CDMS), wherein the ion processing device(s) $16_1$-$16_M$ includes a conventional through-ion mass spectrometer or mass analyzer and one or more corresponding CDMS charge detectors. In some embodiments, the one or more CDMS charge detectors may be provided in the form of one or more electrostatic linear ion traps (ELITs), and in other embodiments the one or more CDMS charge detectors may be provided in the form of at least one orbitrap. In some embodiments, the CDMS detector(s) may include at least one ELIT and at least one orbitrap. CDMS is illustratively a single-particle technique typically operable to measure mass and charge magnitude values of single ions, although some CDMS detectors have been designed and/or operated to measure mass and charge of more than one charged particle at a time. Some examples of CDMS instruments and/or techniques, and of CDMS charge detectors and/or techniques, which may be implemented in a mass spectrometer as, or as part of, the ion processing device(s) $16_1$-$16_M$ of FIG. 1, are disclosed in co-pending International Application Nos. PCT/US2019/013251, PCT/US2019/013274, PCT/US2019/013277, PCT/US2019/013278, PCT/US2019/013280, PCT/US2019/013283, PCT/US2019/013284 and PCT/US2019/013285, all filed Jan. 11, 2019, and the disclosures of which are all incorporated herein by reference in their entireties.

In other embodiments which include a mass spectrometer configured to measure both mass and charge magnitudes of charged particles generated in the ion source region 14 and passed into the ion processing region 16, such a mass spectrometer may be provided in the form of a conventional mass analyzer (e.g., quadrupole mass analyzer or the like) configured to selectively pass therethrough ions of a specified mass-to-charge ratio or ions within a specified range of mass-to-charge ratios, or in the form of a through-ion mass spectrometer likewise configured, followed in either case by an electric field-free drift region including a charge detector array (CDA) configured to measure charge magnitudes or charge states of charged particles exiting the mass analyzer or mass spectrometer. Some example configurations of such a mass spectrometer which may be implemented as, or as part of, the ion processing device(s) $16_1$-$16_M$ of FIG. 1, are disclosed in co-pending U.S. Patent Application Ser. No. 62/949,555 and/or in co-pending U.S. Patent Application Ser. No. 62/949,554, both filed Dec. 18, 2019, and the disclosures of which are both incorporated herein by reference in their entireties.

In some embodiments in which the ion processing device(s) $16_1$-$16_M$ include a mass spectrometer configured to measure both mass and charge of charged particles supplied by the ion source region 14 as described above, the associated charge detector(s) or charge detector array is electrically connected to input(s) of each of a number, N, of charge detection amplifiers CA, and output(s) of the number, N, of charge detection amplifiers CA is/are electrically connected to the processor 26 as shown in FIG. 1, where N may be any positive integer. The charge amplifier(s) CA is/are each illustratively conventional and responsive to charges induced by charged particles on one or more respective charge detectors to produce corresponding charge detection signals at the output thereof, and to supply the charge detection signals to the processor 26.

In any embodiments which includes one or more conventional mass spectrometers, such mass spectrometers may be provided in the form of one or any combination of a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, and oribitrap mass spectrometer or the like.

Examples of the ion mobility spectrometer, in embodiments of the ion processing device(s) $16_1$-$16_M$ which include one or more thereof, include, but are not limited to, a single-tube linear ion mobility spectrometer, a multiple-tube linear ion mobility spectrometer, a circular-tube ion mobility spectrometer, or the like. Examples of one or more devices and/or instruments for collecting charged particles, in embodiments of the ion processing device(s) $16_1$-$16_M$ which include one or more thereof, include, but are not limited to, a quadrupole ion trap, a hexapole ion trap, an ion funnel, or the like. Examples of one or more devices and/or instruments for filtering charged particles, in embodiments of the ion processing device(s) $16_1$-$16_M$ which include one or more thereof, include, but are not limited to, one or more devices or instruments for filtering charged particles according to mass-to-charge ratio, one or more devices or instruments for filtering charged particles according to particle mobility, and the like. Examples of one or more devices and/or instruments for dissociating charged particles, in embodiments of the ion processing device(s) $16_1$-$16_M$ which include one or more thereof, include, but are not limited to, one or more devices or instruments for dissociating charge particles by collision-induced dissociation (CID), surface-induced dissociation (SID), electron capture dissociation (ECD) and/or photo-induced dissociation (PID), or the like.

It will be understood that the ion processing device(s) $16_1$-$16_M$ may include one or any combination, in any order, of any of the above-described instruments, devices or stages, and that some embodiments may include multiple adjacent or spaced-apart ones of any such instruments, devices or stages. As one non-limiting example implementation of the instrument 10 illustrated in FIG. 1, the ion processing device(s) $16_1$-$16_M$ may include a single CDMS configured to measure charged particle mass and charge as described above, and to sequentially supply the measured charged particles to the charged particle deflector or charged particle steering device 18. As other non-limiting example implementation of the instrument 10 illustrated in FIG. 1, the ion processing device(s) $16_1$-$16_M$ may include a single mass spectrometer including a charge detector array configured, as briefly described above, to measure charged particle mass and charge, and to supply the measured charged particles to the charged particle deflector or charged particle steering device 18. In either of these examples, the processor 26 is illustratively programmed to control the voltage source VS2 to cause the mass spectrometer instrument to measure charged particle mass and charge. As yet another non-limiting example implementation of the instrument 10 illustrated in FIG. 1, the ion processing device(s) $16_1$-$16_M$ may include a mass-to-charge ratio filter, e.g., in the form of a quadrupole mass analyzer. In this example, the processor 26 is illustratively programmed to control the voltage source VS2 to cause the mass-to-charge ratio filter to selectively pass therethrough to the charged particle deflector or charged particle steering device 18 only ions having a specified mass-to-charge ratio or only ions having mass-to-charge ratios within a specified range of mass-to-charge ratios. In some such embodiments, the ion processing device(s) $16_1$-$16_M$ may further include a mass spectrometer disposed between the mass-to-charge ratio filter and the charged particle deflector or charged particle steering device 18, and configured to measure mass and charge of charged particles exiting the mass-to-charge ratio filter. In some such embodiments, the ion processing device(s) $16_1$-$16_M$ may further still include a particle dissociation stage or device disposed between the mass-to-charge ratio filter and the mass spectrometer, and configured to dissociate charged particles exiting the mass-to-charge ratio filter. In such examples, the processor 26 is illustratively programmed to control the voltage source VS2 to operate the example device(s) and/or stage(s) in a conventional manner. Other examples and example combinations of the ion processing device(s) $16_1$-$16_M$ will occur to those skilled in the art, and it will be understood that all such examples and example combinations are intended to fall within the scope of this disclosure. In any case, the processor 26 is configured, e.g., programmed, to control the voltage source VS2 to produce one or more voltages for controlling the ion processing device(s) $16_1$-$16_M$ to operate in a conventional manner and/or as described herein.

In embodiments which include it, the charged particle deflector or charged particle steering device 18 is illustratively configured to selectively pass through the outlet thereof only charged particles having one or more specified molecular characteristics or having one or more molecular characteristics within a range of molecular characteristics. The remaining charged particles are, in the case of a charged particle deflector blocked, e.g., by directing such charged particles into an electrically conductive structure, or, in the case of a charged particle steering device, directed away from the outlet from which charged particles are collected, e.g., through another passageway or outlet from which charged particles are not collected or stored.

In one example embodiment, the charged particle deflector or steering device 18 may be implemented in the form of a conventional single inlet, single outlet charge deflector configured and controllable to selectively pass or block passage of ions therethrough. In another example embodiment, the charged particle deflector or steering device 18 may be implemented in the form of a conventional single inlet, multiple-outlet charge steering device configured and controllable to selectively steer ions entering the single inlet through the one of multiple different ion outlets from which purified charged particles are collected. In either case, another voltage source VS3 is electrically connected to the processor 26 via a number, K, of signal paths, where K may be any positive integer, and is further electrically connected to the charged particle deflector or steering device 18 via a number, L, of signal paths, where L may likewise be any positive integer. In some embodiments, the voltage source VS3 may be implemented in the form of a single voltage source, and in other embodiments the voltage source VS3 may include any number of separate voltage sources. In some embodiments, the voltage source VS3 may be configured or controlled to produce and supply one or more time-invariant (i.e., DC) voltages of selectable magnitude. Alternatively or additionally, the voltage source VS3 may be configured or controlled to produce and supply one or more switchable time-invariant voltages, i.e., one or more switchable DC voltages. Alternatively or additionally, the voltage source VS3 may be configured or controllable to produce and supply one or more time-varying signals of selectable shape, duty cycle, peak magnitude and/or frequency. Generally, one or more outputs of the voltage source VS3 is/are illustratively coupled to the charged particle deflector or steering device 18, and it will be understood that the number of such outputs and/or the type(s) of voltages produced thereat will depend on the type of charged particle deflector or steering device 18 implemented. In any case, the memory 28 illustratively has instructions stored therein which, when executed by the processor 26, cause the processor 26 to control the voltage source VS3 to produce one or more output voltages for selectively controlling operation of the charged particle deflector or steering device 18.

In some embodiments in which the charged particle deflector or steering device 18 is implemented in the form of a single inlet, single outlet charge deflector, the processor 26 is illustratively operable to deflect a charged particle entering the inlet thereof into an electrically conductive structure, e.g., an electrically conductive plate, tube or rod, by controlling the voltage source VS3 to create an electric field E of sufficient magnitude to divert and accelerate the charged particle P into the electrically conductive structure. The processor 26 is illustratively operable, in such embodiments, to pass a charged particle entering the inlet though the outlet thereof by controlling the voltage source VS3 to create conditions within the deflector, e.g., small or no electric field, which allows passage of the charged particle therethrough. In some embodiments in which the charged particle deflector or steering device 18 is implemented in the form of a single inlet, multiple outlet charge deflector, the processor 26 is illustratively operable to steer a charged particle entering the inlet thereof into a passageway and/or through an outlet from which purified charged particles are not collected by controlling the voltage source VS3 to create an electric field E of sufficient magnitude to steer the charged particle P through such an outlet. The processor 26 is illustratively operable, in such embodiments, to pass a charged particle entering the inlet though an outlet thereof from which purified charged particles are collected by controlling the voltage source VS3 to create conditions within the charge steering device which allows passage of the charged particle through the respective outlet. A number of alternate embodiments of the charged particle deflector or steering device 18 are illustrated and described in U.S. Patent Application No. 62/52/949,555, filed Dec. 18, 2019 and which has been incorporated herein by reference, although it will be understood that such embodiments are provided only by way of example. Other charged particle deflection and/or steering instruments or devices will occur to those skilled in the art, and it will be understood that any other such charged particle deflection and/or steering instruments or devices are intended to fall within the scope of this disclosure.

In some embodiments, as briefly described above and as illustrated in FIG. 1 by dashed-line representation, an ion trap 20 may be coupled to the charged particle deflector or steering device 18. In such embodiments, yet another voltage source VS4 is electrically connected to the processor 26 via a number, P, of signal paths, where P may be any positive integer, and is further electrically connected to the ion trap 20 a number, Q, of signal paths, where Q may likewise be any positive integer. In some embodiments, the voltage source VS4 may be implemented in the form of a single voltage source, and in other embodiments the voltage source VS4 may include any number of separate voltage sources. In some embodiments, the voltage source VS4 may be configured or controlled to produce and supply one or more time-invariant (i.e., DC) voltages of selectable magnitude. Alternatively or additionally, the voltage source VS4 may be configured or controlled to produce and supply one or more switchable time-invariant voltages, i.e., one or more switchable DC voltages. Alternatively or additionally, the voltage source VS4 may be configured or controllable to produce and supply one or more time-varying signals of selectable shape, duty cycle, peak magnitude and/or frequency. One or more outputs of the voltage source VS4 is/are illustratively coupled to the ion trap 20, and the memory 28 illustratively has instructions stored therein which, when executed by the processor 26, cause the processor 26 to control the voltage source VS4 to produce one or more output voltages for controlling the ion trap 20 to selectively trap and store charged particles therein and to produce one or more output voltages for controlling the ion trap 20 to selectively release and accelerate the trapped particles therefrom.

The processor 26 is further illustratively coupled via a number, R, of signal paths to one or more peripheral devices 30 (PD), where R may be any positive integer. The one or more peripheral devices 30 may include one or more devices for providing signal input(s) to the processor 26 and/or one or more devices to which the processor 26 provides signal output(s). In some embodiments, the peripheral devices 30 include at least one of a conventional display monitor, a printer and/or other output device, and in such embodiments the memory 28 has instructions stored therein which, when executed by the processor 26, cause the processor 26 to control one or more such output peripheral devices 30 to display and/or record analyses of the operation of the instrument 10 including, for example, but not limited to, particle spectral information measured by the instrument 10.

As briefly described above, the instrument 10 is illustratively operable, illustratively under the control of the processor 26 via control of the voltage sources VS1, VS2, VS3 and in some embodiments VS4, to purify charged particles generated by the ion generator 22 by selectively passing therethrough only a subpopulation or subset of the generated charged particles having one or more molecular characteristics or having one or more molecular characteristics within a range of one or more molecular characteristics. In some embodiments, for example, the subpopulation or subset may illustratively include only charged particles of a specified mass or having masses within a specified range of masses. In other embodiments, the subpopulation or subset may illustratively include only charged particles of a specified charge or having masses within a specified range of charge magnitudes or charge states. In still other embodiments, the subpopulation or subset may illustratively include only charged particles of a specified mass along a specified charge or range of charge magnitudes or charge states, or particles having mass values within a specified range of mass values along with a specified charge or range of charge magnitudes or charge states. In yet other embodiments, the subpopulation or subset may illustratively include only charged particles of a specified mass-to-charge ratio or having mass-to-charge ratio values within a specified range of mass-to-charge ratio values. In some such embodiments, the subpopulation or subset may further include only such charged particles that also have a specified mass value or that also have mass values within a specified range of mass values and/or only charged particles that also have a specified charge magnitude or charge state value or that also have charge magnitudes or charge states that are within a specified range of charge magnitude values or charge state values. In still further embodiments, the subpopulation or subset may illustratively include only charged particles of a specified mobility or only charged particles having mobilities within a specified range of mobility values. In some such embodiments, the sub-population or subset may be further restricted in a specified charged particle mass value or mass value range, in a specified charge magnitude or charge state or specified range thereof, in a specified mass-to-charge ratio or range thereof, or in any combination just described. Those skilled in the art will recognize that the number and type(s) of the charged particle instruments $16_1$-$16_M$ implemented in any particular embodiment of the instrument 10 will depend on the particular subpopulation or subset of charged particles sought for purification, and that various different types and combinations of the charged particle instruments $16_1$-$16_M$ described above may be used to collect the desired subpopulation or subset. Moreover, those skilled in the art will recognize other molecular characteristic subpopulations or subsets and/or combinations thereof that may be sought for purification, and it will be understood that such other molecular characteristic subpopulations or subsets and/or combinations, as well as various instruments and instrument combinations for collecting the same, are intended to fall within the scope of this disclosure.

Also depicted in FIG. 1 is a simplified process 12 for collecting and, in some embodiments, processing the collected, purified particles. In some embodiments, for example, the subpopulation or subset of charged particles exiting the instrument 10 are collected on a surface 40A of a particle collection target 40 via particle deposition, e.g., via low energy deposition, or other conventional particle collection technique. The particle collection target 40, or at least the surface 40A thereof, is illustratively a non-reactive or inert material so as not to bond or otherwise react with the purified charged particles exiting the instrument 10. In some embodiments, the particle collection surface 40A of the particle collection target 40 may be viscous or oleaginous or otherwise configured or constructed such that the purified charged particles exiting the instrument 10 may be effectively collected thereon over a period of time. In other embodiments in which the ion trap 20 is included, purified charged particles exiting the instrument 10 may be trapped and collected within the ion trap 20 over a period of time, and then released in bulk from the ion trap 20 and onto the surface 40A of the particle collection target 40. In any case, the particle collection surface 40A of the particle collection target 40 is illustratively configured to not only collect purified charged particles exiting the instrument 10 but to also provide for harvesting the collected purified particles therefrom. In some embodiments, for example, the purified particles collected on the surface 40A of the particle collection target 40 may be harvested by rinsing the surface 40A with a liquid solution 45 dispensed from a solution source 42 and directing the resulting combination 46 of the solution 45 carrying the purified particles into a suitable container 44. Those skilled in the art will recognize other techniques, instruments, devices and the like for harvesting the purified particles collected on the collection surface 40A of the particle collection target 40, and it will be understood that any such other techniques, instrument, devices and the like are intended to fall within the scope of this disclosure.

In some embodiments, the harvested collection of purified particles may be amplified, i.e., duplicated or otherwise multiplied, in a conventional particle amplifier or particle amplification process 48. In implementations in which the purified particles are or include DNA, for example, the particle amplifier or amplification process 48 may illustratively take the form of a conventional polymerase chain reaction (PCR) instrument or process to amplify or duplicate the particles across several orders of magnitude, e.g., thousands or millions of copies. Those skilled in the art will recognize other instruments and/or processes for amplifying the harvested, purified particles, whether they are or include DNA and/or other molecular components, and it will be understood that any such other particle amplification instruments and/or processes are intended to fall within the scope of this disclosure.

Figure 2:
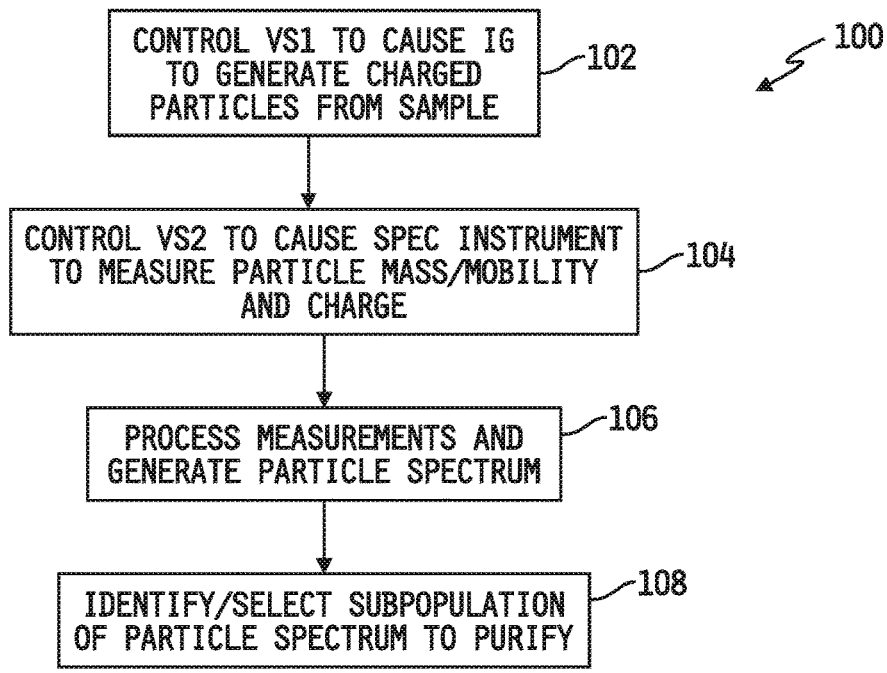
FIG. 2 is a simplified flowchart of an embodiment of a process for controlling the instrument of FIG. 1 to generate and measure charged particles, and to generate a resulting spectrum from which a subpopulation of the charged particles may be identified or selected for purification.

In some cases, it may be desirable to observe a full, or at least a partial, molecular characteristic spectrum of the sample 24 in order to identify, or to facilitate identification of, a subpopulation or subset thereof for purification. In this regard, a simplified flowchart is shown in FIG. 2 depicting a process 100 for operating the instrument 10 of FIG. 1 to measure one or more molecular characteristics of charged particles generated from a sample 24 and to process such measurements to produce a multi-dimensional, e.g., 2 or more, molecular characteristic spectrum. At least some of the steps of the process 100 are stored in the memory 28 in the form of instructions executable by the processor 26 to carry out the measurements, analysis and visualization of the spectrum. The process 100 begins at step 102 where the processor 26 is illustratively operable to control the voltage source VS1 to cause the ion generator 22 to generate charged particles from the sample 24, and to supply the generated charged particles to the ion processing region 16. Thereafter at step 104, the processor 26 is operable to control the voltage source VS2 to cause the one or more instruments or devices of the ion processing region 16 to measure two or more molecular characteristics.

In some embodiments, as described above with respect to FIG. 1, the ion processing region 16 may include or be implemented in the form of a mass spectrometer configured to measure particle mass and particle charge. In some such embodiments, for example, such a mass spectrometer may be implemented in the form of a charge detection mass spectrometer (CDMS), and in other embodiments, such a mass spectrometer may be implemented in the form of a mass analyzer, mass-to-charge filter or other instrument configured to measure mass-to-charge ratio (conventional MS) followed by a charge detector array (CDA), some examples of which are illustrated and disclosed in U.S. Patent Application Ser. No. 62/949,555, filed Dec. 18, 2019 and the disclosure of which has been incorporated herein by reference. In other embodiments, the ion processing region 16 may include or be implemented in the form of an ion mobility spectrometer (IMS) followed by such a charge detector array. In still other embodiments, the ion processing region 16 may include or be implemented in the form of a combination of a mass spectrometer, an ion mobility spectrometer and a charged particle charge measurement instrument or device. In some such embodiments, for example, the ion processing region 16 may include an IMS followed by a CDMS or an IMS followed by a conventional MS followed by a CDA. In other such embodiments, as additional examples, the ion processing region 16 may include a conventional MS followed by an IMS followed by a CDA, a conventional MS followed by a CDA followed by an IMS, or a CDMS followed by an IMS. In these example embodiments of the ion processing region 16, the processor 26 is illustratively operable at step 104 to control the voltage source VS2 to cause the spectrometer instrument(s) to measure the charge magnitudes or charge states of the generated charged particles and the mass and/or mobility values of the generated charged particles as illustrated in FIG. 2.

Following step 104, the processor 26 is operable to process the measurements made at step 104 and generate a charged particle spectrum therefrom. As one illustrative example in which the sample 24 is a liquid solution of urinary exosomes and the ion processing region 16 is implemented in the form of a CDMS or conventional MS followed by a CDA, the processor 26 is illustratively operable at step 106 to generate a scatter plot of charged particle charge magnitude (in units of elementary charge e) vs. charged particle mass (in units of mega-Daltons MDa) as shown in FIG. 4A.

Following step 106, the process 100 advances to step 108 where the spectrum produced at step 106 is analyzed, e.g., visually or automatically by the processor 26, to determine a suitable subpopulation or subset of the particles to purify. The subpopulation or subset of particles may illustratively be selected based on one or any combination of particle mass, mass-to-charge ratio, charge (magnitude or charge state) or mobility value(s) or range(s).

Figure 3:
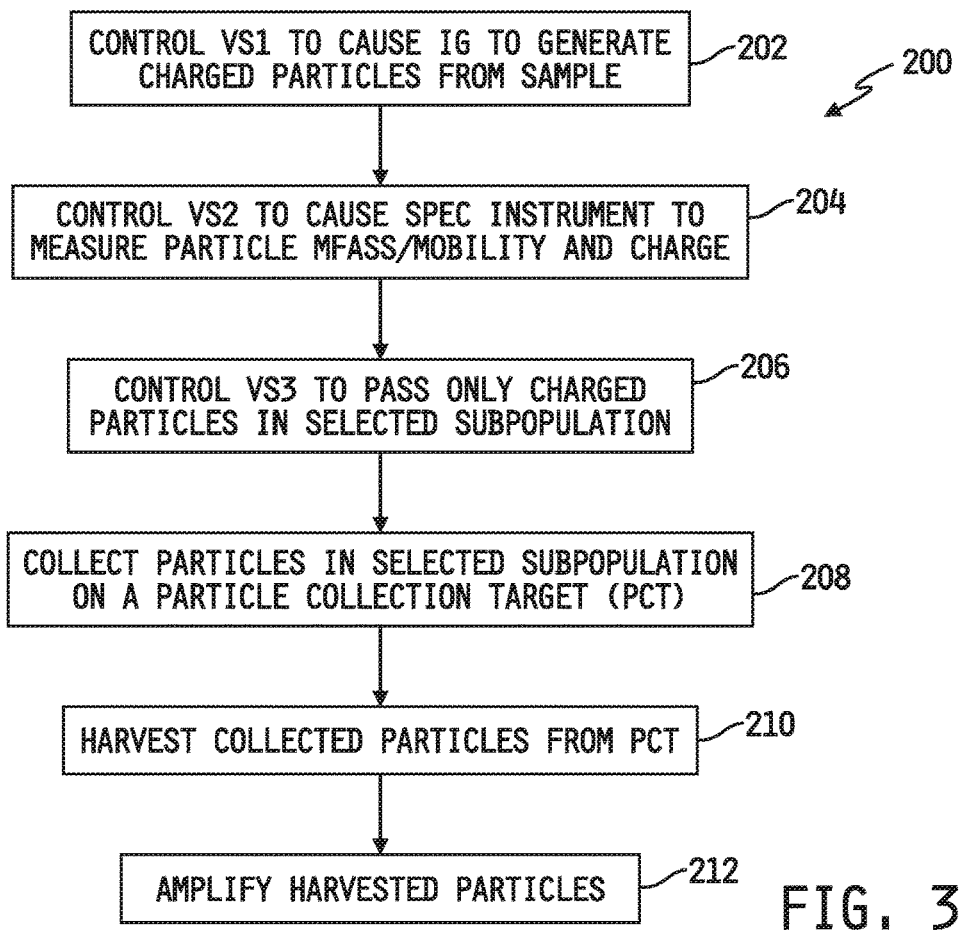
FIG. 3 is a simplified flowchart of an embodiment of a process for controlling the instrument of FIG. 1 to purify particles by generating, measuring and filtering charged particles, and for collecting the purified particles.

Referring now to FIG. 3, a simplified flowchart is shown of a process 200 for purifying particles from the sample 24 using any of various embodiments of the instrument 10 illustrated in FIG. 1. In some embodiments, the implementation of the instrument 10 used to carry out the process 100 illustrated in FIG. 2 may also be used following the process 100 to carry out the process 200 illustrated in FIG. 3. In other embodiments, e.g., in which the molecular characteristic values and/or ranges for purification are known in advance, the process 100 illustrated in FIG. 2 may not be carried out and the configuration of the instrument 10 may be specifically selected to achieve or facilitate the desired purification. In any case, at least some steps of the process 200 are illustratively stored in the memory 28 in the form of instructions executable by the processor 26 to carry out purification of a selected subpopulation or subset of charged particles generated from the sample 24 illustrated in FIG. 1. The process 200 begins at step 202 where the processor 26 is illustratively operable to control the voltage source VS1 to cause the ion generator 22 to generate charged particles from the sample 24, and to supply the generated charged particles to the ion processing region 16. Thereafter at step 204, the processor 26 is operable to control the voltage source VS2 to cause the one or more instruments or devices of the ion processing region 16 to measure two or more molecular characteristics. Various combinations of instruments or devices may be implemented in the ion processing region 16 to measure any two or more molecular characteristics, and several examples of such instruments or devices and such one or more molecular characteristics are given above in the description of the process 100. In these example embodiments of the ion processing region 16, the processor 26 is illustratively operable at step 204 to control the voltage source VS2 to cause the spectrometer instrument(s) to measure the charge magnitudes or charge states of the generated charged particles and the mass and/or mobility values of the generated charged particles as illustrated by example in FIG. 3, although it will be understood that at step 204 the ion processing region 16 may be alternatively implemented in different forms, i.e., with different instruments, and/or that the one or more molecular characteristics may be measurable molecular characteristics other than, or in addition to, particle mass, mass-to-charge ratio, mobility and charge (magnitude or charge state).

Following step 204, the process 200 advances to step 206 where the processor 26 is operable to control the voltage source VS3 to cause the charged particle deflector or charged particle steering device 18 to pass through the charged particle outlet thereof, or through a specified one of multiple charged particle outlets thereof, only charged particles in a selected subpopulation or subset of the charged particles generated by the ion generator 22. As described above, the subpopulation or subset of the charged particles generated by the ion generator 22 may be selected based on one or any combination of measured values of particle mass, mass-to-charge ratio, charge (magnitude or charge state) or mobility value(s) or range(s). With such measured values known by the processor 26 as the respective charged particles exit the ion processing region 16, the processor 26 is operable to control the charged particle deflector or charged particle steering device 18, e.g., via control of the voltage source VS3, to selectively pass therethrough for collection only those charged particles having the one or combination of measured molecular characteristic values defined by the selected subpopulation or subset of the charged particles generated by the ion generator 22. Some example subpopulations or subsets of the spectrum of urinary exosomes illustrated FIG. 4A will be described below with respect to FIGS. 4B-4H, as well as some example configurations and implementations of the instrument 10 for purifying such subpopulations, for purposes of demonstrating operation of steps 204 and 206 of the process 200.

Following step 206, the process 200 advances to step 208 where the charged particles exiting the charged particle deflector or charged particle steering device 18 through the sole outlet thereof, or through the selected one of multiple outlets thereof, are collected. In embodiments of the instrument 10 which include the ion trap 20, step 208 illustratively includes control by the processor 26 of the voltage source VS4 to supply one or more voltages to the ion trap 20 to cause the ion trap 20 to collect and store therein such charged particles exiting the charged particle deflector or charged particle steering device 18 through the sole outlet thereof, or through the selected one of multiple outlets thereof. Following expiration of a collection time period in which the ion trap 20 is operable to collect and store the exiting charged particles therein, the processor 26 is further operable at step 208 to control the voltage source VS4 to supply one or more voltages to the ion trap 20 to cause the ion trap 20 to release and direct the stored ions toward and onto the collection surface 40A of the collection target 40. In embodiments of the instrument 10 which do not include the ion trap 20, step 208 illustratively includes collecting on the collection surface 40A of the collection target 40 charged particles as they exit the charged particle deflector or charged particle steering device 18. Thereafter at step 210, the purified particles collected on the collection surface 40A of the particle collection target 40 are harvested, e.g., as described above with respect to FIG. 1. In some embodiments, the process 200 includes another step 212 following step 210 in which the harvested particles are amplified, i.e., duplicated or multiplied, in a conventional manner as described above.

Figure 5:
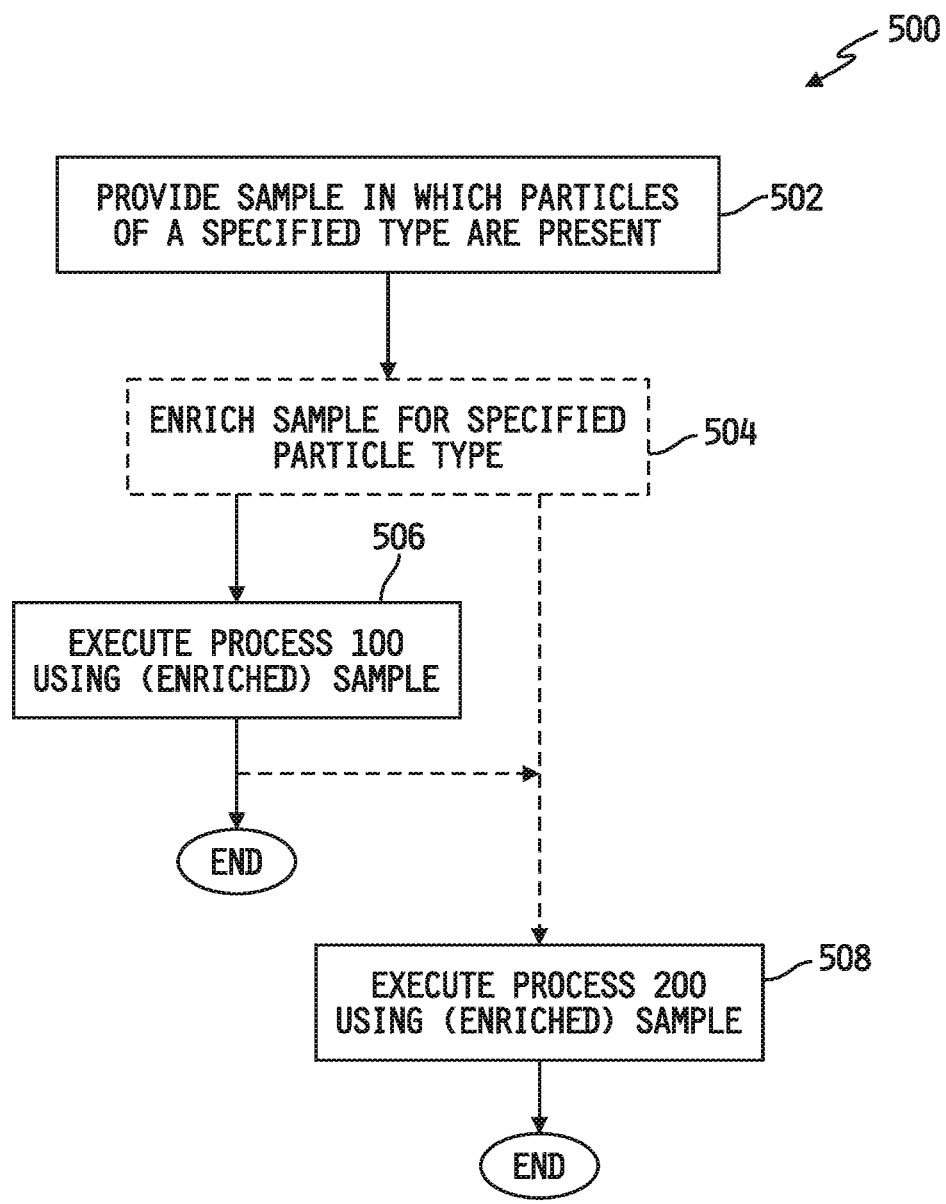
FIG. 5 is a simplified flowchart of an embodiment of another process for controlling the instrument of FIG. 1 to identify, collect and/or purify populations and/or sub-populations of specified types of charged particles.

Referring now to FIG. 5, a simplified flowchart is shown of a process 500 for controlling any of the various embodiments of the instrument 10 of FIG. 1 to identify, collect and/or purify populations and/or sub-populations of specified types of charged particles purifying particles from the sample 24. The process 500 begins at step 502 where a sample is provided in which particles of a specified type are present. The specified particles may be any particles, e.g., molecules, or collection thereof that are in or part of a cell, and/or that are transported between cells, and that have masses in or greater than the megadalton range. Example types of particles present in the sample, and for which the sample is selected and provided, may be or include, but are not limited to, exomes, endosomes, microvessicles generally, ectosomes, apoptotic bodies, retroviruses, exomeres, chylomicrons, DNA, RNA, proteins, fats, acids, carbohydrates, enzymes, viruses, bacteria, or the like. Examples of other samples and/or particles of interest present in samples, all of which are intended to fall within the scope of this disclosure, include, but are not limited to, any cell that emits an exosome or extracellular vesicle, any molecule or collection thereof that is encased in a bio-layer, e.g., a virus, any non-compartmentalized organelles grouped together but not bound by or in a bio-layer, any extracellular vesicle that has been altered in a manner that results in a detectable mass shift, e.g., by adding one or more small molecules thereto, by adding a drug, such as a cancer drug, thereto or the like, that is or is part of any biological tissue(s), fluid(s), cell(s) and/or other biological material(s).

In some embodiments, the sample provided at step 502, in which particles of a specified type are present, may be the sample 24 depicted in FIG. 1 from which charged particles are generated for analysis by the instrument 10. In some alternate embodiments, the process 500 may include step 504, as shown by dashed-line configuration, at which the sample provided at step 502 is enriched for the specified particle type. Following step 504, in embodiments which include it, the process 500 illustratively advances, in one embodiment, to step 506 where the process 100 illustrated in FIG. 2 is executed using the enriched sample 24, i.e., the sample provided at step 502 and enriched at step 504 for the specified particle type. In embodiments which do not include step 504, step 506 is executed following step 502 such that the process 100 illustrated in FIG. 2 is executed using the sample 24 in which particles of the specified type are present. In some embodiments, step 108 of the process 100, in which a sub-population of the particle spectrum is identified and/or selected for purification, may include execution of one or more conventional statistical and/or modeling processes carried out on the data set of particles for the purpose of identifying and/or selecting one or more sub-populations of particles. One example such statistical process will be described below with respect to Example 8.

In some embodiments, the process 500 ends after execution of step 506. In some alternate embodiments, the process 500 advances from step 506 to step 508 where the process 200 illustrated in FIG. 3 is executed using the enriched sample 24 to purify particles of the specified type or one or more sub-populations thereof as identified at step 506. In some alternate embodiments, the process 500 may advance directly to step 508 from step 504 in embodiments which include step 504, or directly from step 502 in embodiments which do not include step 504, as described above with respect to FIG. 3.

In some embodiments which include step 504, the process (es) used to enrich the sample for the specified particle type may depend on the sample type and/or on the specified particle type, and will in any case be known to those skilled in the art. In such embodiments, the enriched sample resulting from step 504 will be the sample 24 depicted in FIG. 1 from which charged particles are generated for analysis by the instrument 10. One example such process used to enrich exosomes from a sample of bovine milk, which should not be considered to be limiting in any way, is described below in Example 8. In other embodiments which include or which do not include step 504, various configurations and/or implementations of the ion processing region 16 of the instrument 10 may be used to enrich, and/or to assist in enriching, the sample for the specified type of particles. For example, in some embodiments the sample may include unwanted particles known to exist in one or more ranges of particle mass, mass-to-charge ratio and/or mobility that is/are different from the range(s) of mass, mass-to-charge ratio and/or mobility of the particles in the sample of the specified type, and in such embodiments the ion processing region 16 may be variously configured, as described above, to filter out some or all such unwanted particles prior to executing step 506 and/or step 508.

EXAMPLES

Example 1

Figure 4B:
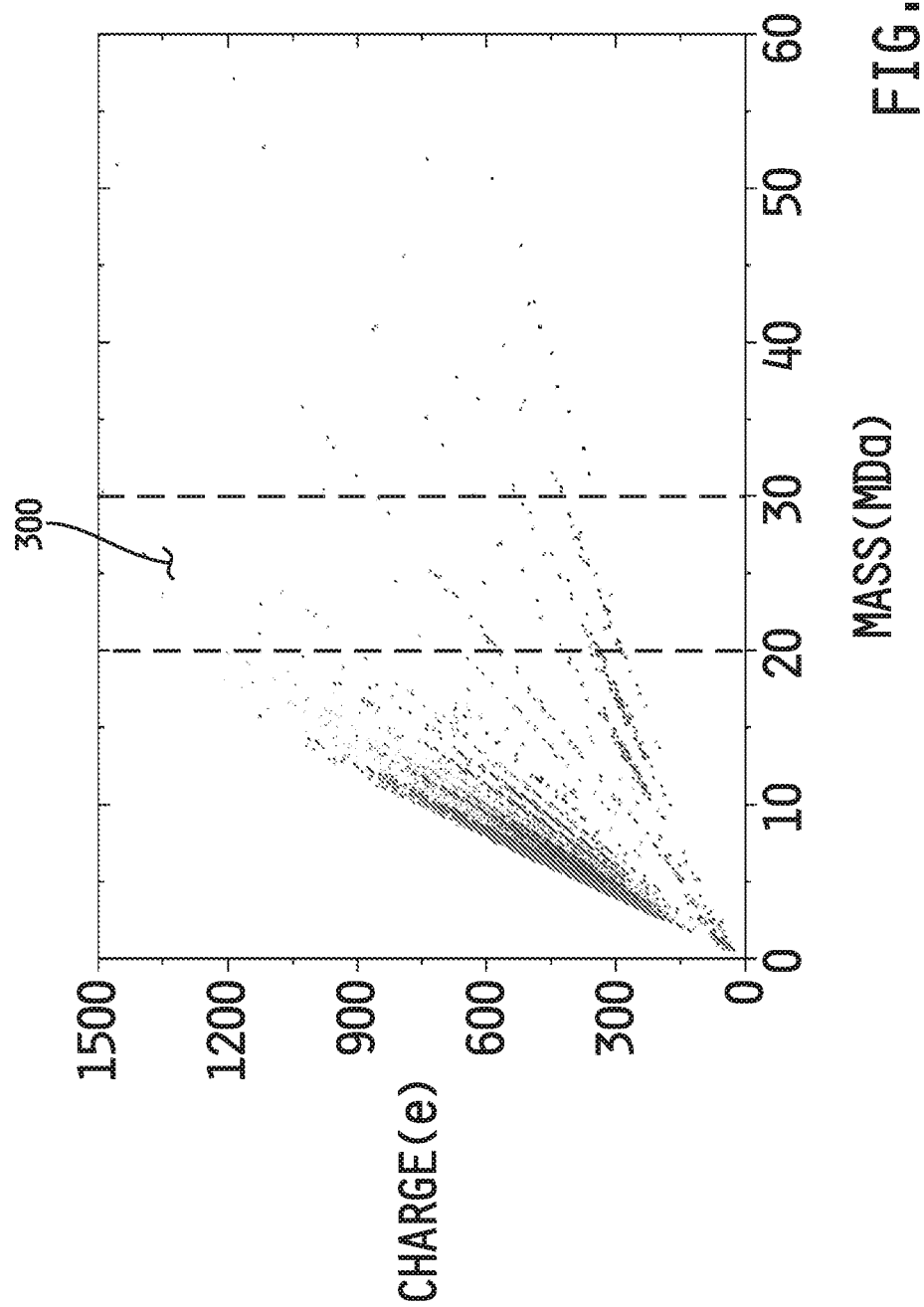
FIG. 4B is the plot of FIG. 4A on which is superimposed an example selection by the instrument of FIG. 1 of a subpopulation of particles for purification, wherein the selected subpopulation is defined by a specified range of particle mass values.

Referring now to FIG. 4B, the plot of urinary exomes of FIG. 4A is reproduced upon which is superimposed an example selection by the instrument of FIG. 1 of a subpopulation or subset 300 of particles for purification according to steps 204 and 206 of the process 200 illustrated in FIG. 3. In this example, the selected subpopulation 300 is defined solely by a specified range of particle mass values between 20 and 30 MDa. In order for the processor 26 to control the voltage source VS3 at step 206 to cause the charged particle deflector or charged particle steering device 18 to pass therethrough to the particle target 40 only charged particles having particle masses within the specified particle mass range of 20-30 MDa, the particle measurement information produced by the one or more instruments or devices of the ion processing region 16 must include particle mass information or particle measurement information from which particle mass can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass directly or to determine particle mass from charged particle measurements taken by the instrument(s). It will be understood, however, that the ion processing region 16 may alternatively be or include any instrument or device or combination of instruments or devices configured to measure particle mass or configured to measure one or more characteristics or properties of the particles from which the particle mass can be determined or estimated. In any case, with the particle mass information determined at step 204, the processor 26 is operable at step 206 to control the voltage source VS3 to cause the charged particle deflector or charged particle steering device 18 to pass a charged particle exiting the ion processing region 16 to the particle target 40 only if the mass of that particle is within the specified particle mass range of 20-30 MDa, and to otherwise control the voltage source VS3 to cause the charged particle deflector or charged particle steering device 18 to block passage of the particle to the target 40 or to steer the charged particle away from the target 40.

Example 2

Referring now to FIG. 4C, the plot of urinary exomes of FIG. 4A is again reproduced upon which is superimposed another example selection by the instrument of FIG. 1 of another subpopulation or subset 302 of particles for purification according to steps 204 and 206 of the process 200 illustrated in FIG. 3. In this example, the selected subpopulation 302 is defined solely by a specified range of particle charge magnitude values between 750 and 900 e. In order for the processor 26 to control the voltage source VS3 at step 206 to cause the charged particle deflector or charged particle steering device 18 to pass therethrough to the particle target 40 only charged particles having particle charge values within the specified particle charge range of 750-900 e, the particle measurement information produced by the one or more instruments or devices of the ion processing region 16 must include particle charge information or particle measurement information from which particle charge can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle charge directly or to determine particle charge from charged particle measurements taken by the instrument(s). It will be understood, however, that the ion processing region 16 may alternatively be or include any instrument or device or combination of instruments or devices configured to measure particle charge or configured to measure one or more characteristics or properties of the particles from which the particle charge can be determined or estimated. In any case, with the particle charge information determined at step 204, the processor 26 is operable at step 206 to control the voltage source VS3 to cause the charged particle deflector or charged particle steering device 18 to pass a charged particle exiting the ion processing region 16 to the particle target 40 only if the magnitude of the charge that particle is within the specified particle charge magnitude range of 750-900 e, and to otherwise control the voltage source VS3 to cause the charged particle deflector or charged particle steering device 18 to block passage of the particle to the target 40 or to steer the charged particle away from the target 40.

Example 3

Figure 4D:
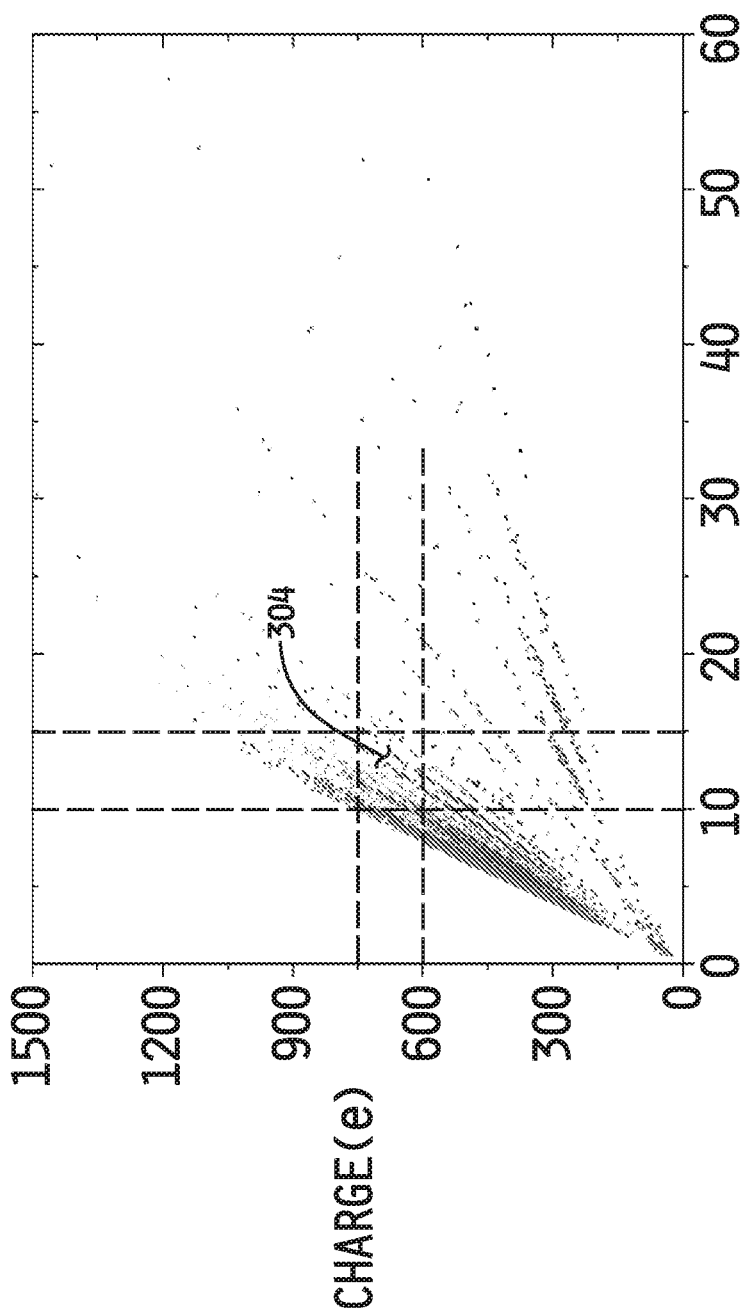
FIG. 4D is the plot of FIG. 4A on which is superimposed yet another example selection of a subpopulation of particles for purification, wherein the selected subpopulation is defined by a specified range of particle charge values and a specified range of particle mass values.

Referring now to FIG. 4D, the plot of urinary exomes of FIG. 4A is yet again reproduced upon which is superimposed yet another example selection by the instrument of FIG. 1 of yet another subpopulation or subset 304 of particles for purification according to steps 204 and 206 of the process 200 illustrated in FIG. 3. In this example, the selected subpopulation 304 is defined by a specified range of particle mass values between 10 and 15 MDa and also by a range of charge magnitude values between 600 and 700 e. In order for the processor 26 to control the voltage source VS3 at step 206 to cause the charged particle deflector or charged particle steering device 18 to pass therethrough to the particle target 40 only charged particles having particle mass values within the specified particle mass range of 10-15 MDA and charge values within the specified particle charge range of 600-750 e, the particle measurement information produced by the one or more instruments or devices of the ion processing region 16 must include particle mass and charge information or particle measurement information from which particle mass and charge can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass and charge directly or to determine particle mass and charge from charged particle measurements taken by the instrument(s). It will be understood, however, that the ion processing region 16 may alternatively be or include any instrument or device or combination of instruments or devices configured to measure particle mass and charge or configured to measure one or more characteristics or properties of the particles from which both particle mass and charge can be determined or estimated. In any case, with the particle mass and charge information determined at step 204, the processor 26 is operable at step 206 to control the voltage source VS3 to cause the charged particle deflector or charged particle steering device 18 to pass a charged particle exiting the ion processing region 16 to the particle target 40 only if the mass of that particle is within the specified particle mass range of 10-15 MDa and the magnitude of the charge of that particle is within the specified particle charge magnitude range of 600-750 e, and to otherwise control the voltage source VS3 to cause the charged particle deflector or charged particle steering device 18 to block passage of the particle to the target 40 or to steer the charged particle away from the target 40.

Example 4

Figure 4E:
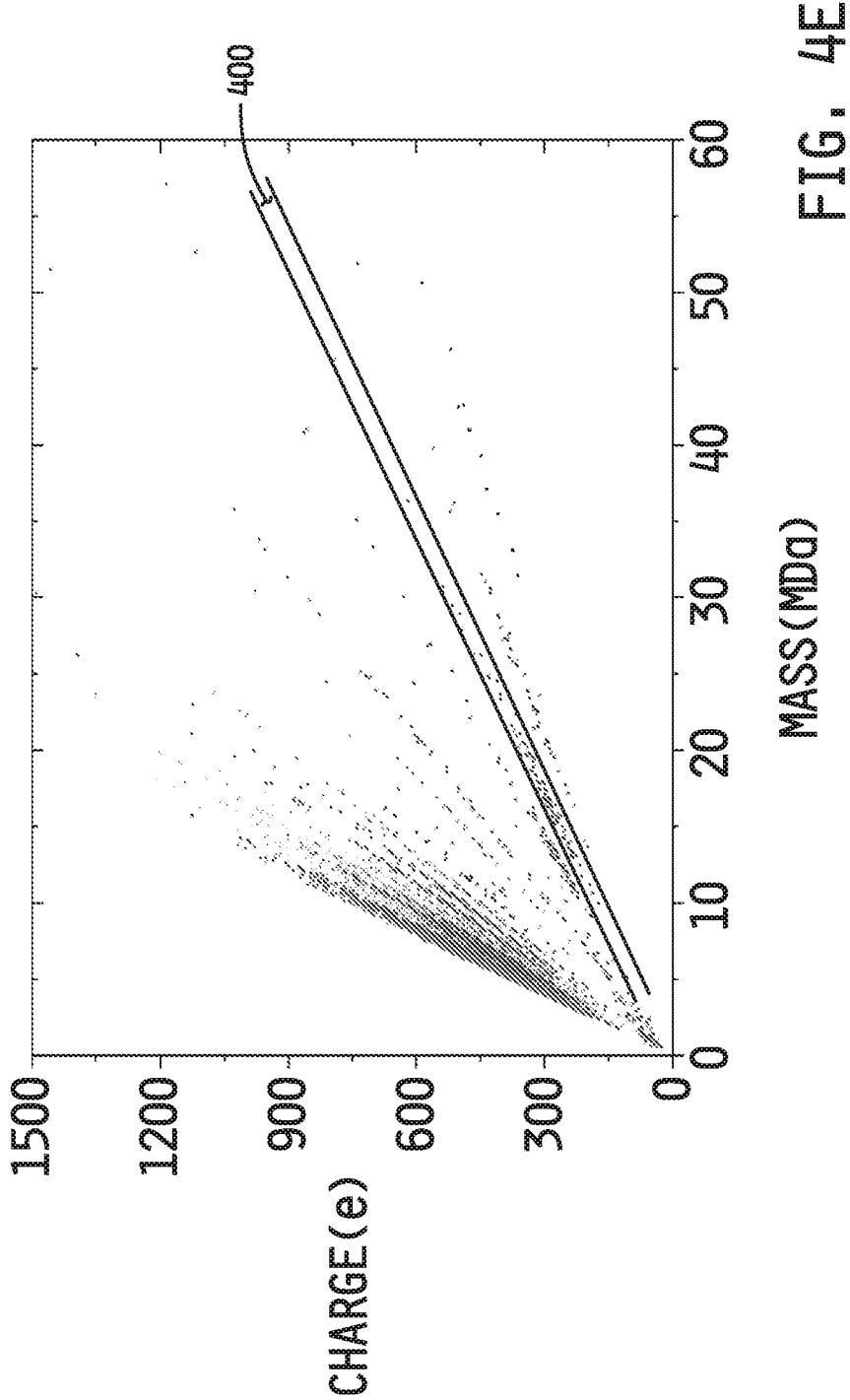
FIG. 4E is the plot of FIG. 4A on which is superimposed still another example selection of a subpopulation of particles for purification, wherein the selected subpopulation is defined by a specified range of particle mass-to-charge ratio values.

Referring now to FIG. 4E, the plot of urinary exomes of FIG. 4A is again reproduced upon which is superimposed still another example selection by the instrument of FIG. 1 of still another subpopulation or subset 400 of particles for purification according to steps 204 and 206 of the process 200 illustrated in FIG. 3. As is evident from the plot of FIG. 4A, the total population of urinary exomes appears to fall along multiple different diagonal or slanted subpopulations, subsets or families, each of which is grouped about or along a different value or range of constant mass-to-charge ratio (s). In this example, the selected subpopulation 400 is defined by a specified one of such values or ranges of particle mass-to-charge ratio(s). In order for the processor 26 to control the voltage source VS3 at step 206 to cause the charged particle deflector or charged particle steering device 18 to pass therethrough to the particle target 40 only charged particles having the specified mass-to-charge ratio value or having mass-to-charge ratios with within the specified range of mass-to-charge ratios, the particle measurement information produced by the one or more instruments or devices of the ion processing region 16 must include particle mass-to-charge ratio information or particle measurement information from which particle mass-to-charge ratio can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass and charge directly or to determine particle mass and charge from charged particle measurements taken by the instrument(s). It will be understood, however, that the ion processing region 16 may alternatively be or include any instrument or device or combination of instruments or devices configured to measure particle mass and charge or configured to measure one or more characteristics or properties of the particles from which both particle mass and charge can be determined or estimated. In any case, the processor 26 is operable in this embodiment to compute particle mass-to-charge ratio as a function of measured particle mass and charge.

With the particle mass-to-charge ratio information determined at step 204, the processor 26 is operable at step 206 to control the voltage source VS3 to cause the charged particle deflector or charged particle steering device 18 to pass a charged particle exiting the ion processing region 16 to the particle target 40 only if the mass-to-charge ratio of that particle is has the specified mass-to-charge ratio or has a mass-to-charge ratio that is within the specified range of particle mass-to-charge ratios, and to otherwise control the voltage source VS3 to cause the charged particle deflector or charged particle steering device 18 to block passage of the particle to the target 40 or to steer the charged particle away from the target 40.

In an alternate embodiment of the instrument 10, the charged particle deflector or charged particle steering device 18 may be omitted and the ion processing region 16 may be implemented in the form of a conventional mass analyzer or mass-to-charge ratio filter, e.g., a quadrupole mass-to-charge ratio filter or the like. In this embodiment, particle charge need not be measured by the ion processing region 16, and the one or more charge amplifiers CA may therefore also be omitted. In this embodiment of the instrument 10, step 206 of the process 200 may be omitted and the processor 26 may be operable at step 204 to control the voltage source VS2 to cause the mass analyzer or mass-to-charge filter to pass therethrough to the particle collection target 40 only charged particles having mass-to-charge values within the selected range 400 of mass-to-charge values.

Example 5

Referring now to FIG. 4F, the plot of urinary exomes of FIG. 4A is again reproduced upon which is superimposed a further example selection by the instrument of FIG. 1 of a further subpopulation or subset 402 of particles for purification according to steps 204 and 206 of the process 200 illustrated in FIG. 3. In this example, like that of Example 4, the selected subpopulation 402 is defined by a specified one of multiple different families of constant mass-to-charge ratios or range of mass-to-charge ratios, and is further defined by a specified range of mass values between 10 and 20 MDa. In order for the processor 26 to control the voltage source VS3 at step 206 to cause the charged particle deflector or charged particle steering device 18 to pass therethrough to the particle target 40 only charged particles having the specified mass-to-charge ratio or having mass-to-charge ratios within the specified range of mass-to-charge ratios and also having mass values within the specified range of mass values, the particle measurement information produced by the one or more instruments or devices of the ion processing region 16 must include particle mass and mass-to-charge ratio information or particle measurement information from which particle mass and mass-to-charge ratio can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass and charge directly or to determine particle mass and charge from charged particle measurements taken by the instrument(s). It will be understood, however, that the ion processing region 16 may alternatively be or include any instrument or device or combination of instruments or devices configured to measure particle mass and charge or configured to measure one or more characteristics or properties of the particles from which both particle mass and charge can be determined or estimated. In any case, the processor 26 is operable to compute particle mass-to-charge ratio as a function of measured particle mass and charge.

With the particle mass and mass-to-charge ratio information determined at step 204, the processor 26 is operable at step 206 to control the voltage source VS3 to cause the charged particle deflector or charged particle steering device 18 to pass a charged particle exiting the ion processing region 16 to the particle target 40 only if the mass-to-charge ratio and the mass of that particle are within the specified range 402 of particle mass and mass-to-charge ratios, and to otherwise control the voltage source VS3 to cause the charged particle deflector or charged particle steering device 18 to block passage of the particle to the target 40 or to steer the charged particle away from the target 40.

Example 6

Figure 4G:
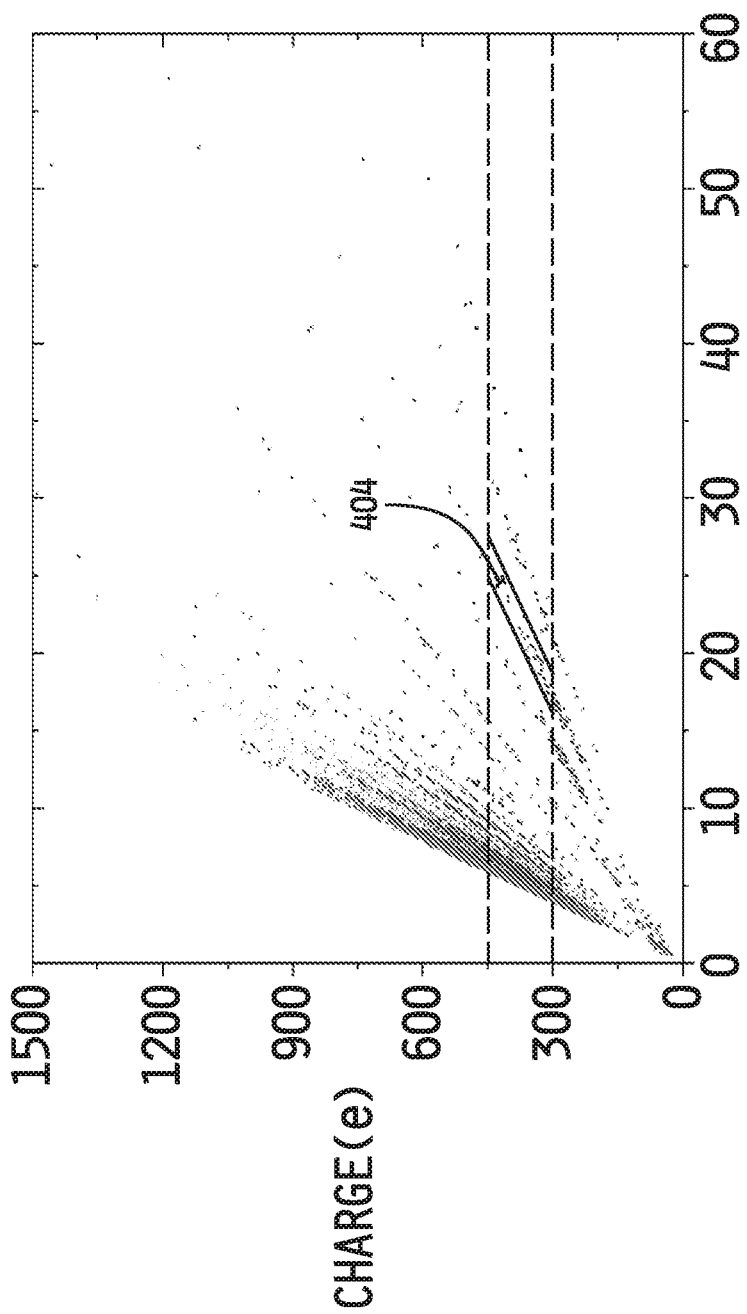
FIG. 4G is the plot of FIG. 4A on which is superimposed yet a further example selection of a subpopulation of particles for purification, wherein the selected subpopulation is defined by a specified range of particle mass-to-charge ratio values and a specified range of particle charge values.

Referring now to FIG. 4G, the plot of urinary exomes of FIG. 4A is again reproduced upon which is superimposed yet a further example selection by the instrument of FIG. 1 of yet a further subpopulation or subset 404 of particles for purification according to steps 204 and 206 of the process 200 illustrated in FIG. 3. In this example, like those of Examples 4 and 5, the selected subpopulation 404 is defined by a specified one of multiple different families of constant mass-to-charge ratios or range of mass-to-charge ratios, and is further defined by a specified range of charge magnitude values between 300 and 450 e. In order for the processor 26 to control the voltage source VS3 at step 206 to cause the charged particle deflector or charged particle steering device 18 to pass therethrough to the particle target 40 only charged particles having the specified mass-to-charge ratio or having mass-to-charge ratios within the specified range of mass-to-charge ratios and also having charge magnitude values within the specified range of charge magnitude values, the particle measurement information produced by the one or more instruments or devices of the ion processing region 16 must include particle mass-to-charge ratio and charge magnitude information or particle measurement information from which particle mass-to-charge ratio and charge magnitude can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass and charge directly or to determine particle mass and charge from charged particle measurements taken by the instrument(s). It will be understood, however, that the ion processing region 16 may alternatively be or include any instrument or device or combination of instruments or devices configured to measure particle mass and charge or configured to measure one or more characteristics or properties of the particles from which both particle mass and charge can be determined or estimated. In any case, the processor 26 is operable to compute particle mass-to-charge ratio as a function of measured particle mass and charge.

With the particle mass-to-charge ratio and charge magnitude information determined at step 204, the processor 26 is operable at step 206 to control the voltage source VS3 to cause the charged particle deflector or charged particle steering device 18 to pass a charged particle exiting the ion processing region 16 to the particle target 40 only if the mass-to-charge ratio and the charge magnitude of that particle are within the specified range 404 of particle mass-to-charge ratios and charge magnitude values, and to otherwise control the voltage source VS3 to cause the charged particle deflector or charged particle steering device 18 to block passage of the particle to the target 40 or to steer the charged particle away from the target 40.

Example 7

Figure 4H:
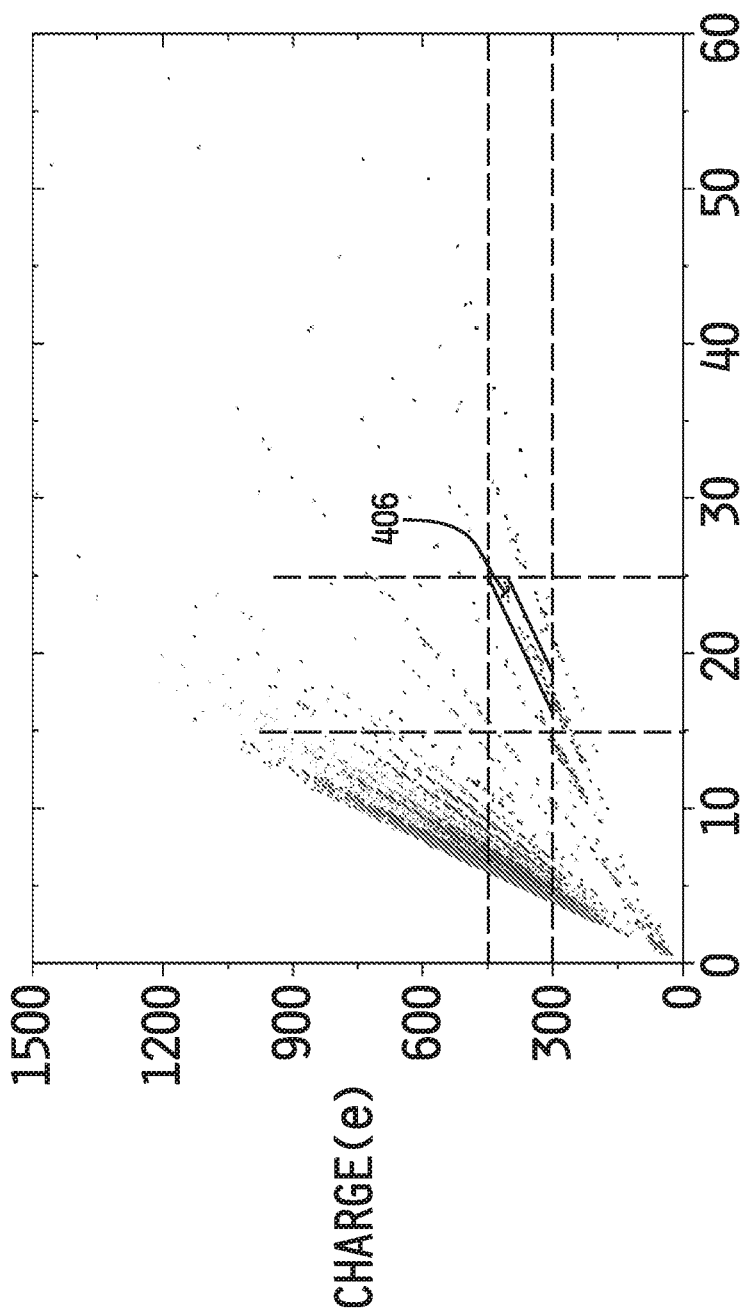
FIG. 4H is the plot of FIG. 4A on which is superimposed still a further example selection of a subpopulation of particles for purification, wherein the selected subpopulation is defined by a specified range of particle mass-to-charge ratio values, a specified range of particle mass values and a specified range of particle charge values.

Referring now to FIG. 4H, the plot of urinary exomes of FIG. 4A is yet again reproduced upon which is superimposed still a further example selection by the instrument of FIG. 1 of still a further subpopulation or subset 406 of particles for purification according to steps 204 and 206 of the process 200 illustrated in FIG. 3. In this example, like those of Examples 4, 5 and 6, the selected subpopulation 406 is defined by a specified one of multiple different families of constant mass-to-charge ratios or range of mass-to-charge ratios, and is further defined by a specified range of mass values between 15 and 25 MDa as well as by a specified range of charge magnitude values between 300 and 450 e. In order for the processor 26 to control the voltage source VS3 at step 206 to cause the charged particle deflector or charged particle steering device 18 to pass therethrough to the particle target 40 only charged particles having the specified mass-to-charge ratio or having mass-to-charge ratios within the specified range of mass-to-charge ratios and also having charge magnitude values within the specified range of charge magnitude values and mass values within the specified range of mass values, the particle measurement information produced by the one or more instruments or devices of the ion processing region 16 must include at mass and charge magnitude information, mass-to-charge ratio and charge magnitude information or particle measurement information from which particle mass, mass-to-charge ratio and charge magnitude can be determined by the processor 26 in advance of step 206. In this example, as described above with respect to FIG. 4A, the ion processing region 16 is illustratively implemented in the form of a CDMS or conventional MS followed by a CDA, either of which is configured to measure, at step 204, particle mass and charge directly or to determine particle mass and charge from charged particle measurements taken by the instrument(s). It will be understood, however, that the ion processing region 16 may alternatively be or include any instrument or device or combination of instruments or devices configured to measure particle mass and charge or configured to measure one or more characteristics or properties of the particles from which both particle mass and charge can be determined or estimated. In any case, the processor 26 is operable to compute particle mass-to-charge ratio as a function of measured particle mass and charge.

With the particle mass-to-charge ratio and charge magnitude information determined at step 204, the processor 26 is operable at step 206 to control the voltage source VS3 to cause the charged particle deflector or charged particle steering device 18 to pass a charged particle exiting the ion processing region 16 to the particle target 40 only if the mass-to-charge ratio, the charge magnitude and the mass of that particle are within the specified range 406 of particle mass-to-charge ratios, charge magnitude values and mass values, and to otherwise control the voltage source VS3 to cause the charged particle deflector or charged particle steering device 18 to block passage of the particle to the target 40 or to steer the charged particle away from the target 40.

It will be understood that while the sample 24 used in the examples illustrated in FIGS. 4A-4H is urinary exomes, in other applications the sample 24 may be any material whether or not biological in nature and whether in solution or otherwise. Additional example biological substances or materials that may be used as the sample 24 may include, but are not limited to, other exomes, endosomes, microvessicles generally, ectosomes, apoptotic bodies, retroviruses, exomeres, chylomicrons, DNA, RNA, proteins, fats, acids, carbohydrates, enzymes, viruses, bacteria, or the like. In some embodiments, the purified (and in some cases amplified) particles may be used to investigate, assemble and/or manufacture gene therapy products and/or other products. It will also be understood that while the examples illustrated in FIGS. 4A-4H illustrate subpopulations or subsets of the charged particles generated from the sample 24 defined by various values or ranges of particle mass, charge and/or mass-to-charge ratio, the instrument 10 illustrated in FIG. 1 and processes 100, 200 for operating the instrument 10 are not so limited. In particular, it will be understood that the instrument 10 may be configured, and the process 100 and/or process 200 may be modified, to collect subpopulations of subsets of charged particles alternatively or additionally defined by values or ranges of particle mobility and/or other molecular characteristics. As one specific example, which should not be considered limiting in any way, the ion processing region 16 may be configured to include instruments for measuring or otherwise determining particle mass, charge and mobility, and various purified, multi-dimensional subpopulations of charged particles may be defined by values and/or ranges of particle mass, mass-to-charge ratio, charge magnitude or charge state and mobility.

Example 8

Referring again to FIG. 5, the process 500 was executed using a sample of bovine milk in which the particles of the specified type are exosomes. At step 502, pooled unprocessed (raw) bovine milk (from approximately 20 animals) was provided. Thereafter at step 504, the sample of raw bovine milk was enriched for exosomes as follows. Within approximately 200 minutes of collection of the bovine milk sample, 50 milliliter aliquots of the raw milk were defatted, and then additionally centrifuged to reduce the amount of apoptotic bodies in the sample. This was illustratively accomplished by centrifugation of the raw milk at 2,000×g for 10 minutes at 4° C. to remove a concentrated layer of milk fat. The remaining suspension was isolated and centrifuged at 12,000×g for 20 minutes at 4° C. to remove cells and other debris. Acetic acid was then added to the supernatant (to a concentration of 1% by volume) and mixed for 5 minutes in order to induce precipitation of non-EV (non-extracellular vesicle) proteins, in particular casein, whose isoelectric point is 4.6. The precipitates were isolated by centrifugation at 10,000×g at 4° C. for 10 minutes following a conventional method. The resulting supernatant, a mixture of proteins, lipids, and other species, including EVs (designated as whey), was ultracentrifuged at 210,000×g for 70 minutes at 4° C. The resulting pellet was resolubilized in 500 microliters of 100 mM ammonium acetate and centrifuged to remove residual precipitates at 10,000×g for 5 minutes at 4° C. The resulting exosome-containing EV supernatant was then diluted by 100-fold in a solution of 100 mM ammonium acetate to form the sample 24 from which ions were generated using the instrument 10 illustrated in FIG. 1.

The instrument 10 was illustratively configured as follows, although it will be understood that the following configuration of the instrument 10 is only one of several different possible configurations of the instrument 10 as illustrated in FIG. 1 and described above. For this particular example, the ion generator 22 was an electrospray ionization (ESI) unit having a ~5 μm diameter borosilicate capillary emitter, and an emitter potential of ~1.4 kV was used to produce the ions from the enriched sample 24. The electrosprayed ions were transmitted through a capillary interface into the source region of the instrument 10, illustratively configured as CDMS instrument as described above. In this particular example, the ion processing region 16 included a hybrid ion funnel—ion carpet interface, e.g., as illustrated and described in co-pending international application PCT/US2019/0132274 and incorporated herein by reference, through which the ions from the source capillary are transmitted. Following the interface, the ions are transmitted through an RF-only hexapole where they undergo collisions that thermalize the ion kinetic energy distribution. As ions exit the hexapole they enter an RF-only quadrupole that acts as a low pass filter tuned to transmit large ions with mass-to-charge (m/z) ratio values above ~12,000. Elimination of low-m/z species ensures that measurement time is optimized for high-m/z ions. A DC offset voltage of 100 V on the hexapole was used to set the nominal ion energy per charge. Ions were then focused into the entrance of a dual hemispherical deflection energy analyzer, and energy-selected ions exiting the energy analyzer were then introduced into an electrostatic linear ion trap (ELIT) that contains a charge detection cylinder.

As each ion enters the ELIT, it induces a charge on the charge detection cylinder. At the time of collection and start of each trapping event, both end caps of the ELIT were in transmission mode, allowing ions to travel through the trap. A trapping event was initiated by switching the back-end cap from transmission to trapping mode, reflecting ions back through the charge detection cylinder and to the entrance of the ELIT. Following a short delay of 0.3 ms, the front-end cap was switched to trapping mode, and trapped ions oscillated back and forth in the ELIT. After 100 ms, the trapping event was terminated and both end caps of the ELIT were switched back to transmission mode. After a delay of 1 ms, the process was repeated for each of the ions. During the 100 ms measurement time, each ion oscillates through the charge detection cylinder of the ELIT, inducing a periodic signal, which is amplified by a charge-sensitive preamplifier CA, digitized, and then analyzed using fast Fourier transforms. The mass-to-charge ratio of the ion is derived from the fundamental frequency of the measurements, and the charge is derived from the magnitude of the fundamental frequency. Mass distributions were generated by multiplying the mass-to-charge values by the charge measured for each ion and binning the resulting masses.

Figure 6A:
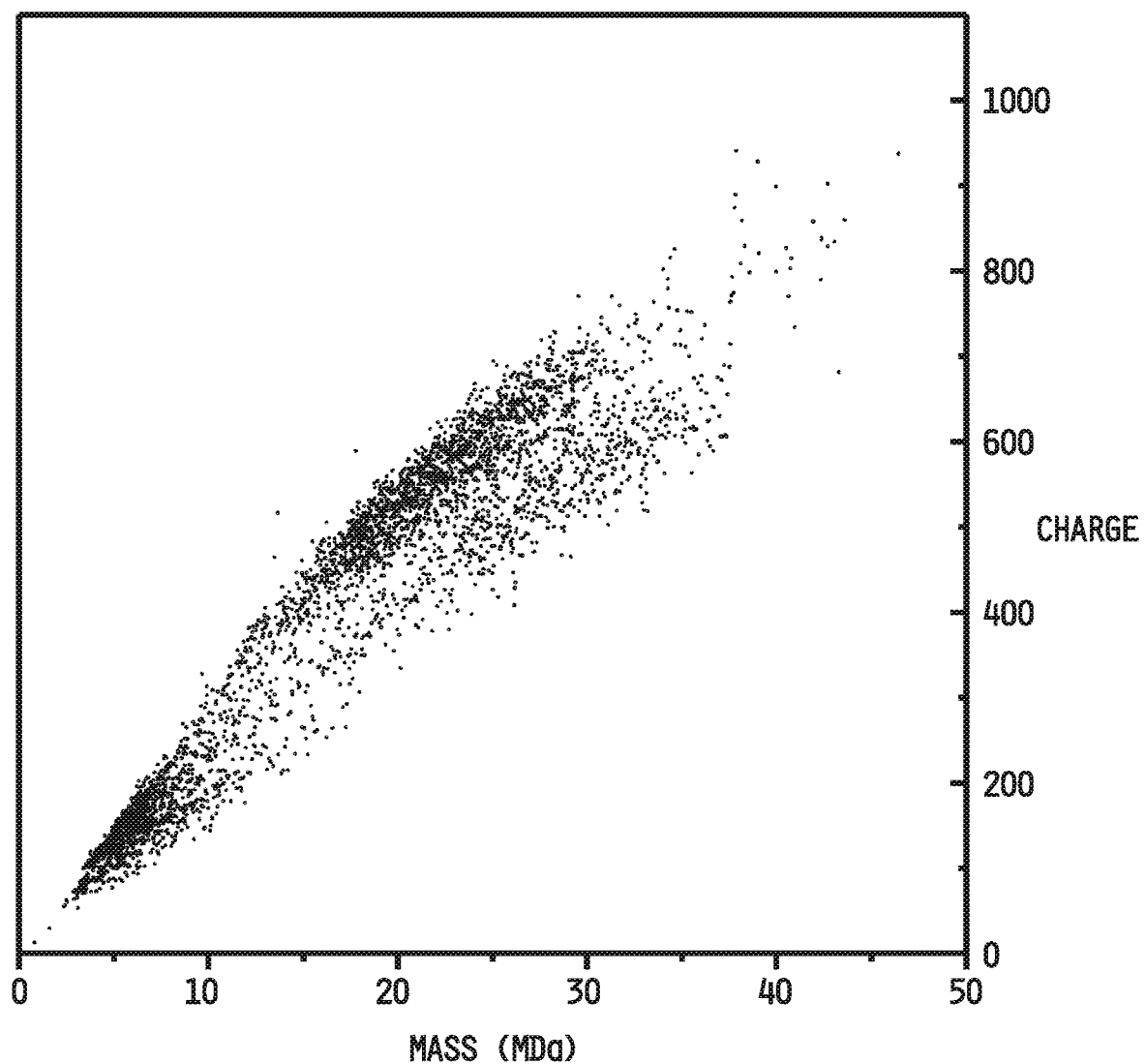
FIG. 6A is a scatter plot of particle charge vs. mass produced from a sample of exosome-enriched bovine milk by an embodiment of the instrument of FIG. 1 and using the process illustrated in FIG. 5, wherein the ion processing region of the instrument is implemented in the form of a charge detection mass spectrometer.

At step 506, the process 100 of FIG. 2 was executed as described above, and at step 106 of the process 100 a scatter plot was generated of charged particle charge magnitude (in units of elementary charge e) vs. charged particle mass (in units of mega-Daltons MDa) as shown in FIG. 6A. Thereafter at step 108, the scatter plot was processed to determine a sub-population of the plot data which could be identified as exosomes. In one embodiment of the process 500, all of the particles having masses greater than 9.8 megadaltons (generally understood to be a minimum mass of an exosome) were deemed to be exosomes, and are identified as such in FIG. 6A as all of the charged particles to the right of the vertical, dashed exosome mass threshold line EMTH. In some embodiments, the process 200 may illustratively be executed as described above to collect and/or purify the exosomes identified at step 108.

Figure 6B:
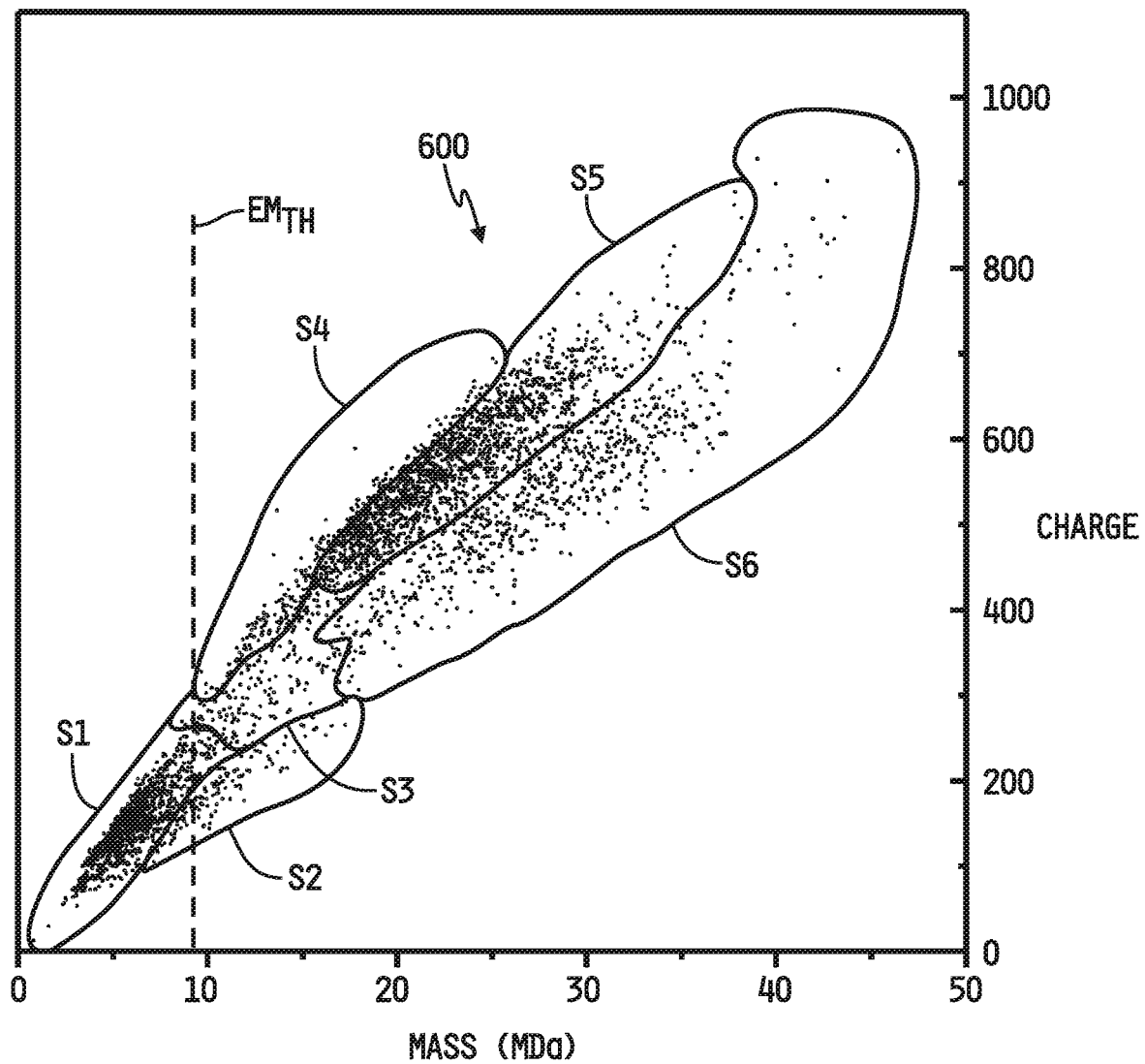
FIG. 6B is the scatter plot of FIG. 6A upon which is overlaid a number of boundaries demonstrating processing of the plotted data into various sub-populations of the charged particles.

In an alternate embodiment of the process 500, the data in the scatter plot of FIG. 6A was processed at step 108 to determine one or more sub-populations of the charged particles which could be identified as exosomes and/or to determine whether there exists multiple sub-populations of the charged particles that are distinguishable from one another, e.g., whether there are sub-populations that may be resolved as families of particles from the CDMS data. In this regard, the processor 26 was programmed at step 108 to execute a conventional two-dimensional Gaussian mixture model (GMM) to fit the two-dimensional mass verses charge data of FIG. 6A, which assumes that sub-populations of particles fall into families of related masses and charges, and that these family distributions are normally distributed. With this assumption the processor 26 was programmed to execute a conventional clustering analysis on the charged particle data that results in multiple distributions of two-dimensional mass verses charge sub-populations. When combined, the sum of these sub-populations captures the main features of the two-dimensional CDMS data. For simplicity the number of possible subpopulations was constrained between one and ten two-dimensional Gaussians. Except for this constraint, the analysis was unsupervised and the algorithm determined the number of subpopulations, as well as the position and width associated with each of the sub-population, that when summed best fit the two-dimensional CDMS dataset. For the CDMS dataset shown in FIG. 6A, this analysis converged on a best fit model that consisted of six independent sub-populations S1-S6 as illustrated by example in FIG. 6B. It will be understood that because each of the six sub-populations of charge particles illustrated in FIG. 6B are Gaussian distributions, the boundaries of each of S1-S6 are only approximations and are included in FIG. 6B only to show the locations and approximate sizes of the sub-populations S1-S6 relative to one another. In alternate embodiments, one or more other conventional statistical models may be used to analyze the particle mass and charge dataset produced by the CDMS 10.

The data in FIG. 6B show that the lowest mass sub-population, S1, observed in the sample 24 corresponds to a relatively narrow distribution, centered at mass (m)=5.7±1.6 MDa and charge (z)=145±38 e. This sub-population, S1, comprises approximately 27% (975 out of 3586) of the total number of charged particles in the data set. The highest mass sub-population, S6, observed in the sample 24 corresponds to a broad distribution, centered at m=27.7±5.4 MDa and z=594±76 e. This sub-population, S6, comprises approximately 22% (772 out of 3586) of the total number of charged particles in the data set. The S2 sub-population (or family), centered at m=10.2±1.9 MDa and z=189±44 e accounts for only 3% of the total number of charged particles in the data set, making it the lowest abundance sub-population. The S3 (m=12.5±2.9 MDa, z=296±31 e) sub-population, comprising approximately 4% of the total number of charged particles, and the S4 (m=17.6±2.6 MDa, z=488±76 e) sub-population, comprising approximately 18% of the total number of charged particles, are substantially more resolved based on charge compared with mass. This suggests that these sub-populations or families are comprised of similarly sized particles that differ substantially at the molecular level, thus influencing each particle's charge more than its mass. The S5 (m=23.4±3.4 MDa, z=550±113 e) sub-population, comprising approximately 26% of the total number of charged particles, appear to be more resolved in the mass than in the charge dimension, indicating that they are more similar in charging characteristics than in size.

From the Gaussian-model cluster analysis undertaken at step 108 of the process 100 as just described, the fraction of particles in the data set that are exosomes can be estimated. With respect to the average masses of the various sub-populations, only the S1 sub-population (m=5.7±1.6 MDa) is too small to be exosomes (based on the minimum exosome mass being approximately 9.8 MDa). As S1 represents 27% of the total number of charged particles in the data set, the remaining 73% of the charged particles in the data set are within the mass range expected for exosomes. In some embodiments, the process 200 may illustratively be executed as described above to collect and/or purify the exosomes identified in this embodiment of step 108.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, in some embodiments in which the ion processing region 16 is implemented in the form of a CDMS, the charge detector of the CDMS may illustratively be controlled to selectively release charged particles or block release of particles therefrom, e.g., by selective control of the voltage source VS2. In embodiments of the CDMS in which the charge detector is an electrostatic linear ion trap (ELIT), for example, the voltages applied by the voltage source VS2 to one or both of the endcaps thereof may illustratively be controlled to allow an ion trapped and oscillating therein to exit the ELIT in the direction of the particle collection target 40, or to cause oscillation of the ion within the ELIT to become unstable and contact a structure therein such that the ion will not be released from the ELIT. In such embodiments, such control of the ELIT may render the charged particle deflector or steering device 18 unnecessary such that it may be omitted. In embodiments of the CDMS in which the charge detector is an orbitrap, the voltage source VS2 may be similarly controlled with the same effect.

What is claimed is:

1. A particle purification device, comprising:
    an ion generator configured to generate charged particles from a sample,
    an ion processing region configured to receive the charged particles generated by the ion generator and to measure at least one of masses and charge magnitudes of the generated charged particles,
    a particle collection target having a collection surface,
    means for selectively passing charged particles exiting the ion processing region to the particle collection target,
    a processor, and
    a memory having instructions stored therein executable by the processor to cause the processor to control the means for selectively passing charged particles to pass to the collection surface of the particle collection target for collection thereon each of the measured charged particles having at least one of (a) a measured mass equal to a selected mass or within a selected range of particle masses, (b) a measured charge magnitude equal to a selected charge magnitude or within a selected range of charge magnitudes, and (c) a mass-to-charge ratio equal to a selected mass-to-charge ratio or within a selected range of mass-to-charge ratios.

2. The particle purification device of claim 1, wherein the instructions stored in the memory further include instructions executable by the processor to cause the processor to control the means for selectively passing charge particles to otherwise block passage to the particle collection target the measured charged particles.

3. The particle purification device of claim 1, wherein the ion processing region comprises a charge detection mass spectrometer configured to receive the charged particles generated by the ion generator and to measure the masses and charge magnitudes of the generated charged particles.

4. The particle purification device of claim 3, wherein the means for selectively passing charged particles exiting the ion processing region to the particle collection target comprises a charged particle deflection or steering device controllable by the processor to selectively pass charged particles therethrough to the particle collection target.

5. The particle purification device of claim 3, wherein the means for selectively passing charged particles exiting the ion processing region to the particle collection target comprises a charge detector of the charge detection mass spectrometer, the charge detector controllable by the processor to selectively pass charged particles therethrough to the particle collection target.

6. The particle purification device of claim 1, further comprising an ion trap disposed between the particle collection target and the means for selectively passing charged particles exiting the ion processing region to the particle collection target, and wherein the instructions stored in the memory further include instructions executable by the processor to cause the processor to control the ion trap to selectively trap therein charged particles exiting the means for selectively passing charged particles exiting the ion processing region to the particle collection target, and to control the ion trap to release charged particles trapped therein and accelerate the charged particles toward the particle collection target.

7. The particle purification device of claim 1, wherein the ion processing region comprises one of a mass analyzer, a mass spectrometer and a mass-to-charge ratio filter configured to pass therethrough charged particles of a selected mass-to-charge ratio or having a mass-to-charge ratio within a selected range of mass-to-charge ratios followed by a charge detector array configured to measure charge magnitudes of charged particles exiting the mass analyzer, a mass spectrometer and a mass-to-charge ratio filter.

8. The particle purification device of claim 7, wherein the means for selectively passing charged particles exiting the ion processing region to the particle collection target comprises a charged particle deflection or steering device controllable by the processor to selectively pass charged particles therethrough to the particle collection target.

9. The particle purification device of claim 7, further comprising an ion trap disposed between the particle collection target and the means for selectively passing charged particles exiting the ion processing region to the particle collection target, and wherein the instructions stored in the memory further include instructions executable by the processor to cause the processor to control the ion trap to selectively trap therein charged particles exiting the means for selectively passing charged particles exiting the ion processing region to the particle collection target, and to control the ion trap to release charged particles trapped therein and accelerate the charged particles toward the particle collection target.

10. A method for purifying particles, comprising:
generating charged particles from a sample,
measuring at least at least one of masses, charge magnitudes and mobilities of the generated charged particles, and
selectively passing to a collection surface of a particle collection target for collection on the collection surface each of the measured charged particles having at least one of (a) a measured mass equal to a selected mass or within a selected range of particle masses, (b) a measured charge magnitude equal to a selected charge magnitude or within a selected range of charge magnitudes, (c) a mass-to-charge ratio equal to a selected mass-to-charge ratio or within a selected range of mass-to-charge ratios, and (d) a measured mobility equal to a selected mobility or within a selected range of mobilities.

11. The method of claim 10, further comprising collecting on the collection surface of the particle collection target the measured charged particles selectively passed thereto.

12. The method of claim 11, further comprising harvesting the charged particles collected on the collection surface of the particle collection target.

13. The method of claim 12, further comprising amplifying the harvested charged particles.

14. A method for measuring exosomes in a sample preparation, the method comprising:
generating ions from the sample preparation,
measuring mass and charge of at least some of the generated ions using a charge detection mass spectrometer, and
identifying from the measured masses of the at least some of the generated ions a subset of the measured ions that are exosome ions.

15. The method of claim 14, further comprising enriching the sample preparation for the exosomes prior to measuring the mass and charge of the at least some of the generated ions.

16. The method of claim 15, further comprising processing the measured masses and charges of the at least some of the generated ions using a statistical model to determine at least two separate sub-families of the generated ions.

17. The method of claim 14, further comprising collecting at least a portion of the subset of the measured ions that are exosome ions.

18. The method of claim 17, further comprising purifying the collected at least a portion of the subset of the measured ions that are exosome ions.

19. The particle purification device of claim 1, wherein the sample includes exosomes,
and wherein the instructions stored in the memory further include instructions executable by the processor to determine from the measured masses of at least some of the generated charged particles a subset of the generated charged particles having masses identifying the corresponding generated charged particles as exosome ions,
and wherein the instructions stored in the memory further include instructions executable by the processor to control the means for selectively passing charged particles to pass the exosome ions to the particle collection target.

20. The method of claim 10, wherein generating charged particles from a sample comprises generating charged particles from a sample containing exosomes,
and wherein measuring comprises measuring at least the masses of the charged particles,
and wherein the method further comprises identifying from the measured masses of the at least some of the generated charged particles a subset of the generated charged particles that are exosome ions,
and wherein selectively passing comprises passing the exosome ions to the particle collection target.

* * * * *